US007675922B2

(12) United States Patent
Magendanz et al.

(10) Patent No.: US 7,675,922 B2
(45) Date of Patent: Mar. 9, 2010

(54) SYSTEM AND METHOD FOR PROVIDING A UNIVERSAL COMMUNICATIONS PORT WITH COMPUTER-TELEPHONY INTERFACE

(75) Inventors: Chad L Magendanz, Issaquah, WA (US); Manolito E Adan, Woodinville, WA (US); Michael W Van Flandern, Seattle, WA (US); Mohamed Belali, Issaquah, WA (US); Pasquale Demaio, Bellevue, WA (US); Thomas G Phillips, Bellevue, WA (US); William J Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1531 days.

(21) Appl. No.: 10/976,484

(22) Filed: Oct. 29, 2004

(65) Prior Publication Data

US 2006/0165110 A1 Jul. 27, 2006

(51) Int. Cl.
*G06F 13/14* (2006.01)
(52) U.S. Cl. ...................... 370/401; 709/250
(58) Field of Classification Search .......... 370/400, 370/401, 419, 463, 465–467; 709/227, 228, 709/230, 250
See application file for complete search history.

(56) References Cited

U.S. PATENT DOCUMENTS

| | | | | |
|---|---|---|---|---|
| 5,574,722 A * | 11/1996 | Slykhouse et al. | ........ | 370/257 |
| 5,920,698 A * | 7/1999 | Ben-Michael et al. | ....... | 709/224 |
| 5,920,699 A * | 7/1999 | Bare | ........ | 709/225 |
| 5,923,663 A * | 7/1999 | Bontemps et al. | ........ | 370/445 |
| 6,084,881 A * | 7/2000 | Fosmark et al. | ........ | 370/397 |
| 6,218,930 B1 * | 4/2001 | Katzenberg et al. | ........ | 370/200 |
| 6,298,370 B1 * | 10/2001 | Tang et al. | ........ | 718/102 |
| 6,504,851 B1 * | 1/2003 | Abler et al. | ........ | 370/466 |
| 6,563,816 B1 * | 5/2003 | Nodoushani et al. | ........ | 370/352 |
| 6,564,280 B1 * | 5/2003 | Walsh | ........ | 710/305 |
| 6,731,627 B1 * | 5/2004 | Gupta et al. | ........ | 370/352 |
| 6,928,086 B2 * | 8/2005 | Abler et al. | ........ | 370/465 |
| 6,973,077 B1 * | 12/2005 | Olsson et al. | ........ | 370/359 |
| 7,136,673 B2 * | 11/2006 | Yukie et al. | ........ | 455/557 |

(Continued)

OTHER PUBLICATIONS

Pen2/Companion2 Sensor User's Manual, Blood Glucose Testing System, MediSense pp. 1-39, MediSense, Inc., Cambridge, MA 02139, 1990.

*Primary Examiner*—Pankaj Kumar
*Assistant Examiner*—Duc T Duong
(74) *Attorney, Agent, or Firm*—Workman Nydegger

(57) ABSTRACT

A computing system is equipped with one or more ports, each of which includes a plurality of coupler lines configured to engage connectors that may be associated with different types of external services and/or devices, including public switched telephone networks, Ethernet networks, ISDN networks, and/or telephone devices. Upon detecting a connection to a port, a controller evaluates at least one electrical property of the lines of the port. Based on the evaluation, the controller determines if the port is engaged with a known type of service or device. When the type of service or device is known, the controller selectively switches a plurality of port lines to appropriate communications subsystems to enable the computing system to communicate with the device or service. For example, a conventional telephone device can then be used as an audio input/output device for communication over the Internet rather than over a public switched telephone network.

40 Claims, 10 Drawing Sheets

U.S. PATENT DOCUMENTS

| | | | |
|---|---|---|---|
| 7,171,505 B2* | 1/2007 | Kuhlmann et al. | 710/305 |
| 2002/0054599 A1* | 5/2002 | Jeanjean et al. | 370/395.53 |
| 2002/0141352 A1* | 10/2002 | Fangman et al. | 370/254 |
| 2003/0067884 A1* | 4/2003 | Abler et al. | 370/252 |
| 2004/0114610 A1* | 6/2004 | Featherston et al. | 370/401 |
| 2005/0021712 A1* | 1/2005 | Chassapis et al. | 709/223 |

* cited by examiner

SYSTEM AND METHOD FOR PROVIDING A UNIVERSAL COMMUNICATIONS PORT WITH COMPUTER-TELEPHONY INTERFACE

FIELD OF THE INVENTION

The present invention generally pertains to computer connectivity, and more specifically, to providing a more convenient approach for connecting communications systems and external communication devices to a personal computer or workstation.

BACKGROUND OF THE INVENTION

Personal computers continue to become both more popular and more indispensable, in part because of the ability to connect personal computers to communications networks and other devices that greatly expand the resources available to the user. For example, local area networks (LANs) enable personal computer users to share resources such as printers, storage devices, and high-speed Internet access points, so that users can cost effectively share resources over wired and wireless LANs in businesses, schools, and homes. With the ever increasing popularity of—and dependence on—personal computer communications, most personal computers sold today include built-in Ethernet and telephone modem communication ports.

FIG. 1 (prior art) illustrates an exemplary block diagram of a typical telephone communications interface 100 that is representative of many personal computers in use today. Telephone communications interface 100 facilitates communication between a computer bus 102 and telephone network 130. A typical telephone communications interface 100 includes an analog front end (AFE) 110, a digital isolation barrier 112, a data access arrangement (DAA) 114, a number of discrete components 116, and one or more ports 120a and 120b. AFE 110, which performs both analog-to-digital conversion and digital to analog conversion and is therefore commonly referred to as a coder/decoder (CODEC), is configured with the protocols and data rates supported by telephone communications interface 100. Conventionally, the data protocols and data rates are hard wired into an application-specific integrated circuit (ASIC), which allows for rapid processing of data communications without adding communications overhead to the computer. Digital isolation barrier 112 provides voltage surge protection to AFE 110, bus 102, and the rest of the computing system (not shown), protecting against voltage surges that might appear on communication lines that are coupled to telephone communications interface 100 via telephone system port 120a and telephone device port 120b. DAA 114 provides a physical interface to external systems and commonly includes line monitoring and detection equipment to determine if a communication line is available, to detect ringing signals, detect caller ID, and to send and receive the actual data communications.

Telephone communications interface 100 couples to telephone network 130 via telephone system port 120a. Telephone system port 120a typically includes a standard RJ-11 jack and is coupled with DAA 114 via a number of discrete components 116 that, among other functions, provide persistent switching between telephone system port 120a and telephone device port 120b, as described in further detail below. Thus, a computing system (not shown) is able to communicate via bus 102 over telephone network 130 using telephone communications interface 100.

Telephone device port 120b typically comprises an additional RJ-11 jack to which a telephone device 140 can be connected and is generally provided as a convenience. Telephone communications interface 100 enables the computing system (not shown) to communicate with telephone network 130 via telephone system port 120a, but provides no communication capability between the computing system and telephone device 140. Telephone device port 120b is provided to enable a user to make use of telephone device 140 to communicate over telephone network 130 when the computing device is not employing telephone communications interface 100. Discrete components 116 disconnect telephone device port 120b from the rest of telephone communications interface 100 when the computing system is using telephone communications interface 100 to communicate over telephone network 130. On the other hand, when the computing system is not using telephone communications interface 100 to communicate over telephone network 130, discrete components 116 couple telephone device 140 to telephone network 130. Therefore, when telephone network 130 and telephone device 140 are connected with telephone communications interface 100, a user can employ the computing system to communicate over telephone network 130, or use telephone device 140 to communicate over telephone network 130, without having to connect, disconnect, and reconnect telephone cables.

In addition, discrete components 116 maintains a persistent connection between telephone device port 120b and telephone system port 120a when a personal computing system is shut off. As a result, again without having to connect, disconnect, and reconnect telephone cables, a user can use telephone device 140 to communicate over telephone network 130 transparently to the presence of the computing system and telephone communications interface 100.

In the configuration of telephone communications interface 100 shown in FIG. 1, telephone device port 120b is provided only as a convenience for telephone device 140. Telephone communications interface 100 does not provide any way for the telephone device to be used with the computing system or to do anything except be coupled to telephone network 130 when telephone communications interface 100 is not using telephone network 130 for data communications with the computing system. Telephone communications interface 100 is not equipped to employ telephone device 140 as a general audio input/output device. Telephone communications interface 100 is neither configured to provide the power needed to operate telephone device 140, nor is configured to match the impedance of the speaker and microphone of telephone device 140 as needed to use the telephone device for input or output. Furthermore, in some telephone communication interfaces 100, because telephone device port 120b is effectively disconnected when the telephone communication interface is being used for data communications, if telephone device 140 is mistakenly connected to telephone system port 120a, and telephone network 130 is connected to telephone device port 120b, telephone communications interface 100 will be unable to connect to telephone network 130 for data communications.

FIGS. 2A-2C (all prior art) illustrate additional problems arising from conventional computer communications interfaces. FIG. 2A illustrates a workstation 200 and illustrates issues that may attend hooking up even a basic personal computer 210 and telephone device 240 to telephone and communications networks. Personal computer 210 is engaged through the use of a monitor 230 and keyboard 236. Monitor 230 is coupled to personal computer 210 using a monitor cable 232 and a monitor connector 234. Similarly, keyboard 236 connects to personal computer 210 using a keyboard cable 238 and a keyboard connector 239. A wall plate 220 provides a telephone jack 222*a*, and a data jack 222*b*, such as an Ethernet port. One end of telephone cable network cable 250 is plugged into telephone jack 222*a*, while the other end presents a telephone network connector 254. Similarly, one end of network cable 260 is plugged into data jack 222*b*, while the other end has a network connector 264. Telephone device cable 242 thus extends from telephone device 240 to telephone device connector 244.

As FIG. 2A shows, and as is well known to many computer users, properly connecting all the cables to a back panel 270 (FIG. 2B) of personal computer 210 presents a challenge, particularly if the back of the computer is not readily accessible or is not well lighted. Fortunately, some of the connectors, such as keyboard connector 239 and monitor connector 234, are easily differentiable from each other by size, shape, and/or color, and often only can fit in the appropriate jack on back panel 270 of personal computer 210. In contrast, properly connecting personal computer 210 to telephone and network service and telephone device 240 may be much more difficult. Typical telephone connectors, such as telephone device connector 244 and telephone network connector 254, are both modular RJ-11 connectors that may be indistinguishable from one another in the jumble of cables behind workstation 200. Furthermore, network connectors such as network connector 264, employ modular RJ-45 connectors. As is widely understood, RJ-11 and RJ-45 connectors have very similar appearances. RJ-45 connectors support more leads than RJ-11 connectors and are slightly wider. However, the depth of both connectors is the same, and both present lines on one side and a securing tab on the opposite side. In fact, by design, RJ-11 and RJ-45 connectors are sufficiently similar that an RJ-11 connector can be received and secured by the securing tab in an RJ-45 jack, which can cause substantial problems.

As a result, even if someone were sufficiently careful to properly connect telephone network cable 250 and network cable 260 to appropriate jacks 222*a* and 222*b*, respectively (after possibly mistakenly inserting telephone network cable 250 into data jack 222*b* and not realizing it until noting that the remaining network connector 264 does not fit into the remaining jack, i.e., telephone jack 220*a*), correctly completing the installation may be difficult. As already indicated, the user may be working in a cramped space under or behind workstation 200, and may not readily be able to move personal computer 210 to more directly access back face 270. Indeed, even after turning personal computer 210 to access back face 270, the task may be challenging. As shown in FIG. 2B, on communications connector area 272*a*, there are at least three nearly identical jacks 274 in close proximity to one another. Connecting the appropriate cables to the appropriate jacks requires very close inspection of back panel 270.

FIG. 2C shows an enlarged view of communications connector area 272*b*. A network adapter 280 presents a network jack 274*a* to which network cable connector 264 (FIG. 2A) should be connected. As described above, however, network jack 274*a* can accommodate an RJ-11 connector, so the installer needs to be careful not to mistakenly plug telephone network connector 254 or telephone device connector 244 into network jack 274*a*. Because ring signals present a relatively high voltage, it is conceivable that such a mistaken connection result in damage to network adapter 280 and/or personal computer 210. Even if network connector 264 is properly connected to network jack 274*a*, the user must be careful to properly connect telephone network connector 254 and telephone device connector 244 to telephone network jack 274*b* and telephone device jack 274*c*, respectively, or telephone communications adapter 290 may not be functional for data communications, as described above. The only way to differentiate between the otherwise identical jacks is to read a usually tiny, pressed or etched "LINE" label 292 and a "PHONE" label 294 that usually appear on the back of telephone communications adapter 290. In sum, the number and similarity of jacks 274 on personal computer can make it frustrating and difficult to properly connect personal computer 210 to desired communications facilities.

The problem in connecting personal computer 210 (FIGS. 2A-2B) is also experienced by users of portable laptop and notebook computers, although the ports on these smaller computers are easier to access. FIG. 3A (prior art) shows a portable computer 300 which, as is typical of portable computers, includes on one or more sides or on the back, a connectivity area 310*a* presenting a plurality of connection ports 320. FIG. 3B (prior art) shows an enlarged view 310*b* of the ports, which include a headphone jack 320*a*, a microphone jack 320*b*, an Ethernet jack 320*c*, and a telephone network jack 320*d*. As will readily be understood, there is a strong emphasis or priority on designing notebook and laptop computers to be as compact and inexpensive as possible. Both space and cost considerations make it desirable to have the fewest number of ports. As a result, no telephone device jack (FIG. 2C) is provided, and the proximity of Ethernet jack 320*c* and telephone network jack 320*d* make it challenging to plug an RJ-11 telephone service connector into the correct jack. Similarly, because most standard headphone and microphone jacks are the same size, only by carefully checking color coding and/or labels around the base of headphone jack 320*a* and microphone jack 320*b* can a user keep from transposing the plugs inserted therein.

Despite the numerous complications in connecting a computing system to communications systems and other devices described above, there are other concerns beyond the difficulty of making the correct physical connections. As one example, there are many businesses, hotels, and other establishments where a user might like to use the telephone communications adapter, but may not be able to do so because of the nature of the telephone system provided in those establishments. Similarly, although Ethernet is a highly popular network topology, many other topologies, such as integrated services data networks (ISDN), are also in use. While many personal computers come with standard Ethernet connectivity, adding an ISDN adapter involves additional cost and consumes available bus expansion slots or PCMCIA slots. Further, the forthcoming power-over-Ethernet standard offers the advantage of providing power and network connectivity over an Ethernet cable, but existing Ethernet adapters will be not be equipped to take advantage of the new topology.

It would thus be highly desirable to make the connectivity of communications systems and other devices to computing systems simpler and more versatile. Specifically, it would be desirable to simplify the process of physically interconnecting communications systems and other devices to computing systems to avoid the confusion and frustration often experienced by users. It would be highly desirable to enable ports to be automatically reconfigurable to whatever type of communication plug that is inserted by the user, or to accept I/O connections using new or different protocols.

SUMMARY OF THE INVENTION

One of the advantages of the present invention is that it provides a simpler approach for connecting a computing system to a number of different external systems without a dedicated port having to be provided for each type of system and without the installer or user having to install particular connectors in particular jacks. Universal communication ports or couplers are configured to receive connectors that may represent a number of different systems. For example, the couplers may include RJ-45 jacks that can receive either RJ-45 or RJ-11 connectors that may be joined with different communications systems or external devices. When a connector is inserted into the jack and the coupler lines electrically contact connector conductors, a controller evaluates the electrical properties of at least a portion of the coupler lines. Based on the electrical properties, such as whether the signals carried are analog or digital, and whether particular voltages, resistances, or impedances are measured on or between particular coupler lines, the controller can identify a number of known types of external systems. Once the controller identifies a known system, a switching system automatically couples the appropriate coupler lines to subsystems that enable the computing system to communicate with the external system.

Using embodiments of the present invention saves cost and space in designing computer systems, because dedicated ports need not be provided for telephone networks, an Ethernet cable, a telephone device, and other devices that a user might be expected to connect to the computer system. Moreover, upon detecting a telephone device, the controller can adaptively employ the telephone device as an input/output device for purposes other than conventional telephony. For example, a user with access to a wired or wireless broadband network and a Voice over Internet Protocol system may couple any conventional telephone to an available port, and the controller can then selectively route the coupler lines engaging the telephone device to appropriate converter subsystems. The user can then place telephone calls without carrying a separate telephone or paying separate telephone charges.

One aspect of the present invention is thus directed to a method for facilitating communication between a computing system and an external system. The computing system is equipped with at least one coupler presenting a plurality of coupler lines configured to engage a connector associated with the external system and presenting a plurality of connector lines. The coupler engages the connector such that at least a first portion of the coupler lines are engaged by at least a portion of the connector lines. An evaluation of at least one electrical property of at least a first portion of coupler lines to determine whether characteristics of the external system are identifiable from among known external systems with which the computing system interfaces. When the evaluation indicates the external system is one that interfaces with the computing system, at least a second portion of the coupler lines is selectively interconnected with at least one subsystem configured to facilitate interfacing the computing system with the external system.

The evaluation of the at least one electrical property of at least one of the first portion of coupler lines includes a number of possible measurements. For example, the measurement can determine whether a first coupler line carries an analog or digital signal, or determine a voltage carried by the first coupler line relative to one of a ground and a second coupler line, or determine a resistance of the first coupler line relative to the second coupler line, and/or an impedance of the first coupler line relative to the second coupler line.

A connection status indicator can be generated to indicate whether the external system is one that interfaces with the computing system. The connection status indicator is configured to present indications representing states of the connection, including whether the external system successfully interfaces with the computing system, whether an external system is detected, but the external system does not successfully interface with the computing system, or whether there appears to be no external system connected with the connector lines. The connection status indicator may include at least one light generating device and be configured to present lights of different colors corresponding to the different states.

Upon identification of the external system, a number of subsystems may be engaged to properly interface with the external system. If the external system is a public switched telephone network, a portion of the conductor lines engaging the connector lines used by the public switched telephone network is coupled with a modem. If the external system is a conventional telephone device, a portion of the coupler lines engaging the conductor lines used for audio input and output is selectively coupled to both a telephone-to-AC97 converter and an AC97 CODEC. If the external system is a user interface telephone device configured to be used as an audio input/output device for a computing device, coupler lines engaging connector lines used for audio input and output are selectively interconnected with the AC97 CODEC. If the external system is an integrated services data network, a portion of the coupler lines engaging connector lines used for integrated services data network communication is selectively interconnected with an integrated services data network terminal adapter. If the external system is an Ethernet network, a portion of the coupler lines engaging conductor lines used for Ethernet communication is selectively interconnected with an Ethernet adapter. Further, if the external device is a power source, the coupler lines engaging the connector lines supplying power are selectively interconnected with a power receiver. In addition, if the external system is a computer input/output device, the conductor lines engaging connector lines used for input/output are selectively interconnected with an input/output interface;

The coupler may include a jack and the connector may include a plug configured to be received within the jack to complete an electrical coupling. For example, the jack may include an RJ-45 jack and the plug may include an RJ-45 plug or an RJ-11 plug.

More specifically, using RJ-45 jacks, identification of a public switched telephone network may be made when the coupler line engaging pin 4 registers a predefined voltage, e.g., about −48 volts, relative to the second coupler line engaging pin 5. Identification of a conventional telephone device may be made when the coupler line engaging pin 3 and a second coupler line engaging pin 4 indicates a predefined resistance, e.g., a resistance between approximately 200 ohms and 300 ohms. Identification of an integrated services data network may be made when the coupler line engaging pin 3 registers a predefined voltage differential, e.g., of between approximately +0.833 volts and +2.5 volts, with the second coupler line engaging one of pins 5 and 6, or when the coupler line engaging pin 4 registers a different predefined voltage differential, e.g., between approximately +0.833 volts and +2.5 volts, relative to the second coupler line engaging one of pins 5 and 6. Identification of the Ethernet network is made when the coupler line engaging pin 1 and the second coupler line engaging one of pins 3 and 6 indicates a predefined resistance, or the coupler line engaging pin 2 and the second coupler line engaging one of pins 3 and 6, e.g., of between approximately 1 ohm and 21 ohms. Identification of a Power over Ethernet network is made when the coupler line engaging pin 4 registers a predefined voltage differential, e.g., of approximately +48 volts, relative to the second coupler line engaging one of pins 7 and 8, or when the coupler line engaging pin 5 registers a predefined voltage differential, e.g., of approximately +48 volts relative to the second coupler line engaging one of pins 7 and 8. Identification of a Gigabit Ethernet network is made when the coupler line engaging pin 4 and the second coupler line engaging pin 5 register no DC voltage:

The computing system may be equipped with a plurality of couplers, each presenting a plurality of coupler lines. When multiple couplers are available, upon the evaluation indicating that a telephone device is connected with a first coupler and that a public switched telephone network is connected with a second coupler, the system can selectively interconnect the coupler lines between the first coupler and the second coupler to enable the telephone device to be used with the public switched telephone network when the computing system is not using the public switched telephone network for data communication. In this case, power can be drawn from the public switched telephone network when the computing system is powered down, to maintain interconnection between the coupler lines between the first coupler and the second coupler.

The subsystems configured to facilitate interfacing the computing system with the external system are preferably implemented by using dedicated hardware and/or by executing instructions using general purpose computing or processing hardware.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 7:
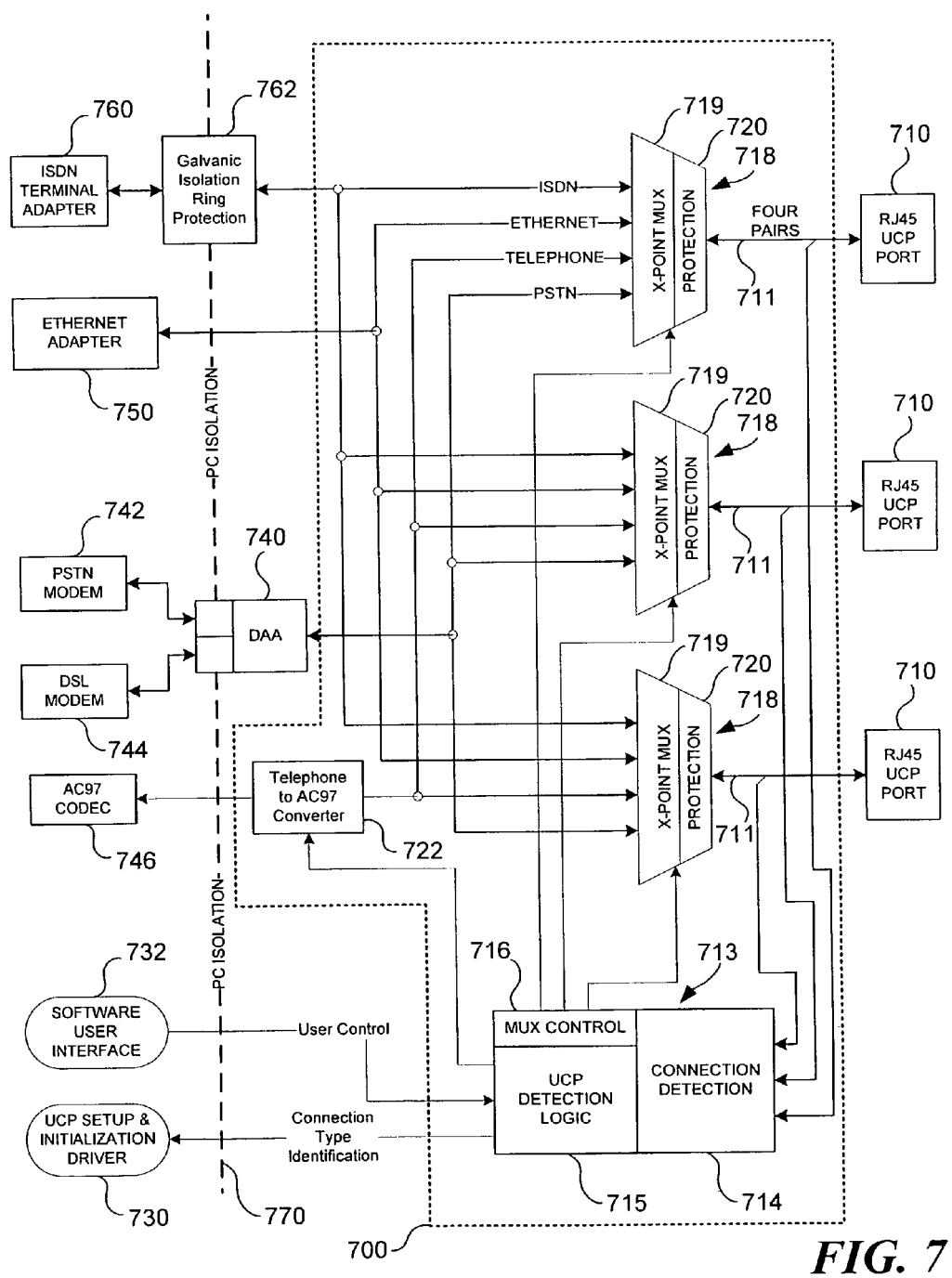
Figure 8:
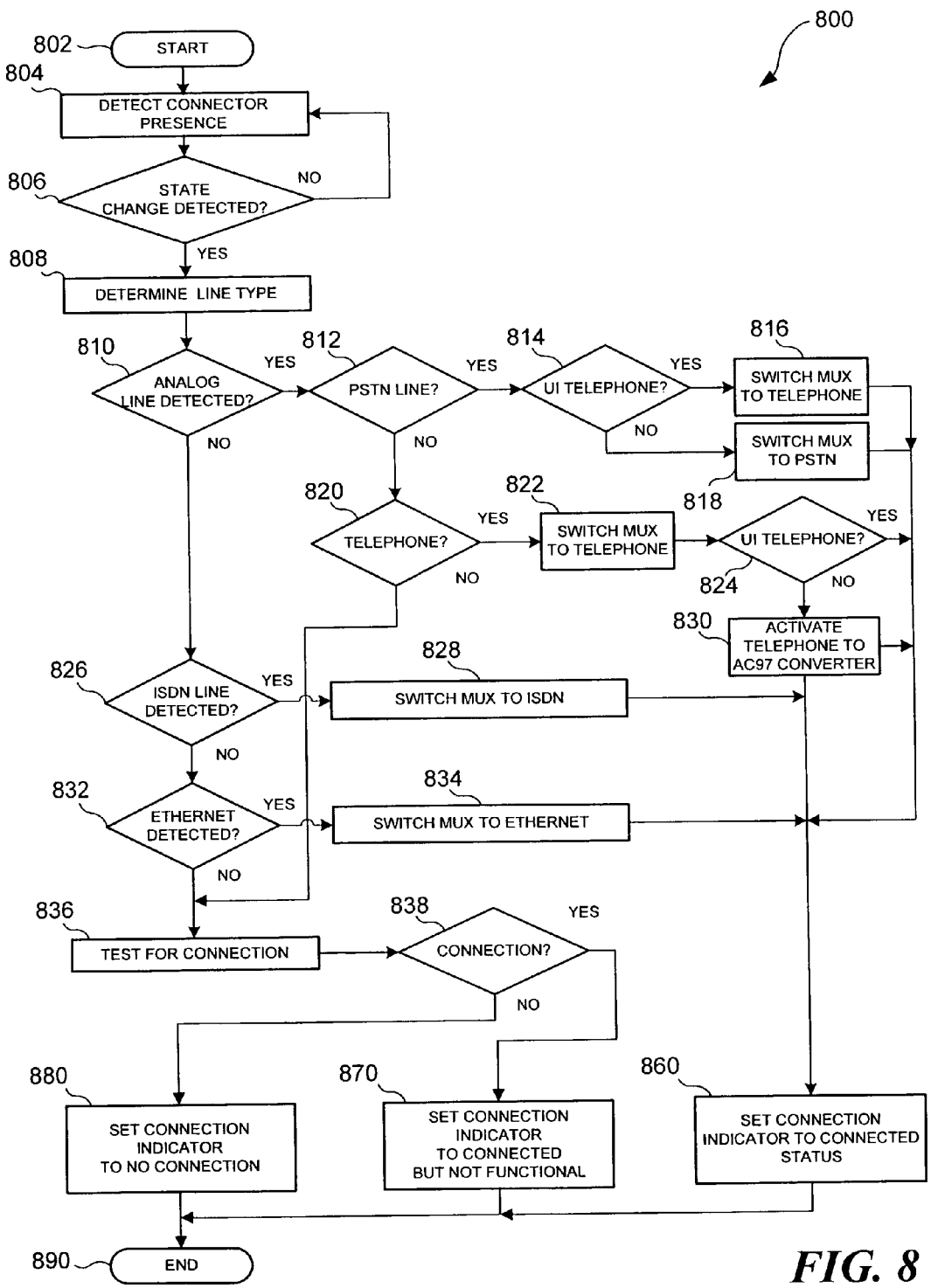

FIG. 7 is a schematic diagram of an embodiment of the present invention showing a communications adapter supporting a plurality of universal communication ports adapted to automatically communicate with a plurality of different external communications networks and/or devices; and FIG. 8 is a flow diagram illustrating the logical steps for evaluating systems and devices connected to the universal communication ports, and configuring the communications adapter to engage the system detected and/or communicate to a user a status of each of these ports.

DESCRIPTION OF THE PREFERRED EMBODIMENT

Exemplary Computing System for Implementing Present Invention

Figure 4A:
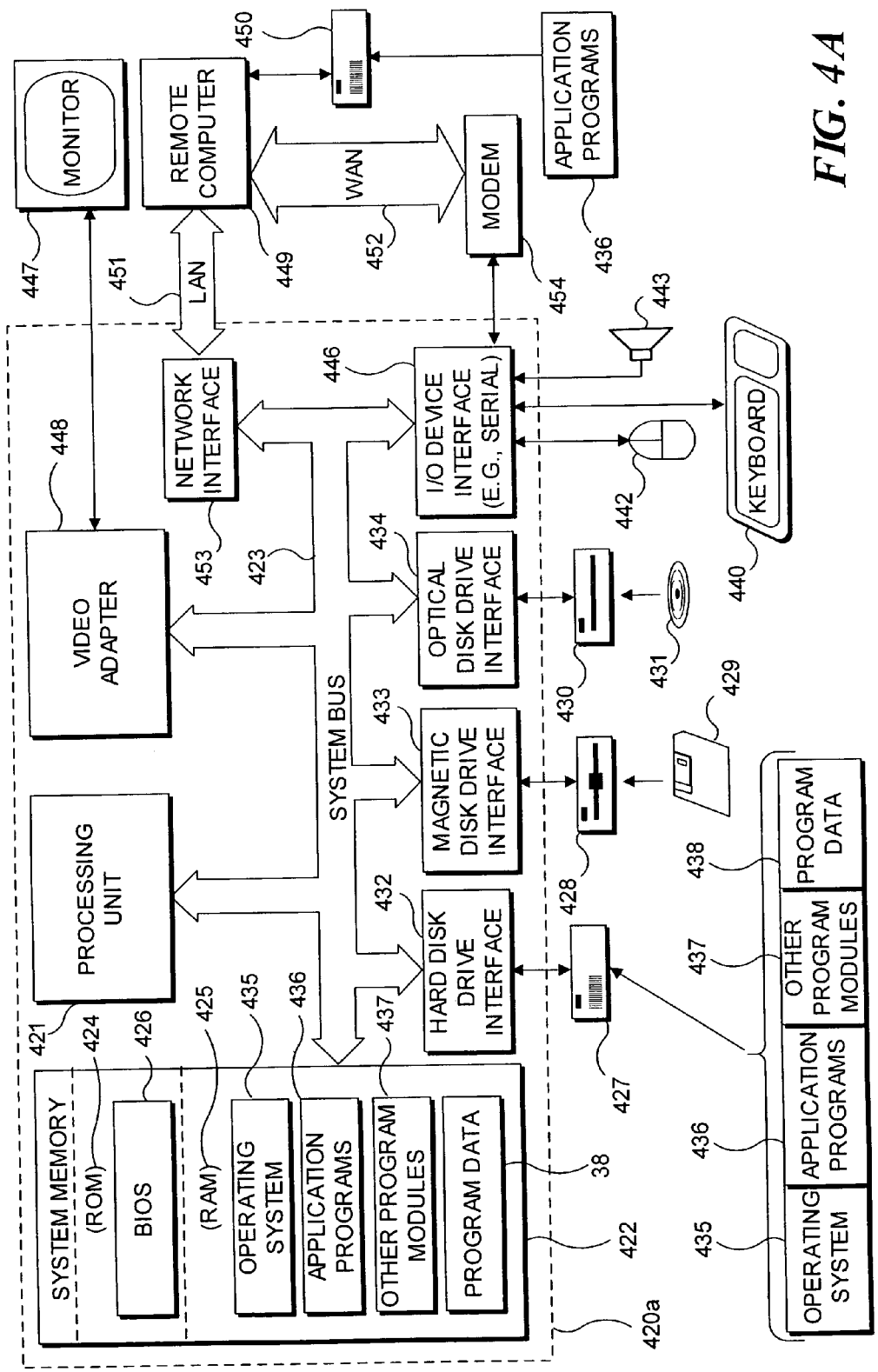
FIG. 4A is functional block diagram of a computing device or PC adaptable to use an embodiment of the present invention.

With reference to FIG. 4A, an exemplary conventional system suitable to be adapted for use in practicing the present invention is shown. The system includes a general purpose computing device in the form of a PC 420a, provided with a processing unit 421, a system memory 422, and a system bus 423. The system bus couples various system components including the system memory to processing unit 421 and may be any of several types of bus structures, including a memory bus or memory controller, a peripheral bus, and a local bus using any of a variety of bus architectures. The system memory includes a read only memory (ROM) 424 and a random access memory (RAM) 425. A basic input/output system 426 (BIOS), containing the basic routines that help to transfer information between elements within PC 420a, such as during start up, is stored in ROM 424. PC 420a further includes a hard disk drive 427 for reading from and writing to a hard disk (not shown), a magnetic disk drive 428 for reading from or writing to a removable magnetic disk 429, and an optical disk drive 430 for reading from or writing to a removable optical disk 431, such as a compact disk-read only memory (CD-ROM) or other optical media. Hard disk drive 427, magnetic disk drive 428, and optical disk drive 430 are connected to system bus 423 by a hard disk drive interface 432, a magnetic disk drive interface 433, and an optical disk drive interface 434, respectively. The drives and their associated computer readable media provide nonvolatile storage of computer readable machine instructions, data structures, program modules, and other data for PC 420a. Although the exemplary environment described herein employs a hard disk, removable magnetic disk 429, and removable optical disk 431, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 429, optical disk 431, ROM 424, or RAM 425, including an operating system 435, one or more application programs 436, other program modules 437, and program data 438. A user may enter commands and information in PC 420a and provide control input through input devices, such as a keyboard 440 and a pointing device 442 that communicate with system bus 423 via I/O device interface 446. Pointing device 442 may include a mouse, stylus, wireless remote control, or other pointer. As used hereinafter, the term "mouse" is intended to encompass virtually any pointing device that is useful for controlling the position of a cursor on the screen. One or more audio input/output device 443, including headsets, speakers, and microphones, also engage personal computer 420a via I/O device interface 446. Still further input devices (not shown) may include a joystick, haptic joystick, yoke, foot pedals, game pad, satellite dish, scanner, or the like. These and other input/output (I/O)

devices are often connected to processing unit 421 through an I/O interface 446 that is coupled to system bus 423. The term I/O interface is intended to encompass each interface specifically used for a serial port, a parallel port, a game port, a keyboard port, and/or a universal serial bus (USB). A monitor 447 is connected to system bus 423 via an appropriate interface, such as a video adapter 448. It will be appreciated that PCs are often coupled to other peripheral output devices (not shown), such as speakers (through a sound card or other audio interface—not shown) and printers.

PC 420a can also operate in a networked environment using logical connections to one or more remote computers, such as a remote computer 449. Remote computer 449 may be another PC, a server (which is typically generally configured much like PC 420a), a router, a network PC, a peer device, or a satellite or other common network node, and typically includes many or all of the elements described above in connection with PC 420a, although only an external memory storage device 450 has been illustrated in FIG. 4. The logical connections depicted in FIG. 4 include a local area network (LAN) 451 and a wide area network (WAN) 452. Such networking environments are common in offices, enterprise wide computer networks, intranets, and the Internet.

When used in a LAN networking environment, PC 420a is connected to LAN 451 through a network interface or adapter 453. When used in a WAN networking environment, PC 420a typically includes a modem 454, or other means such as a cable modem, Digital Subscriber Line (DSL) interface, or an Integrated Service Digital Network (ISDN) interface for establishing communications over WAN 452, such as the Internet. Modem 454, which may be internal or external, is connected to the system bus 423 or coupled to the bus via I/O device interface 446, i.e., through a serial port. In a networked environment, program modules, or portions thereof, used by PC 420a may be stored in the remote memory storage device. It will be appreciated that the network connections shown are exemplary and other means of establishing a communications link between the computers may be used, such as wireless communication and wide band network links.

Computing System Using Embodiments of the Present Invention

Figure 4B:
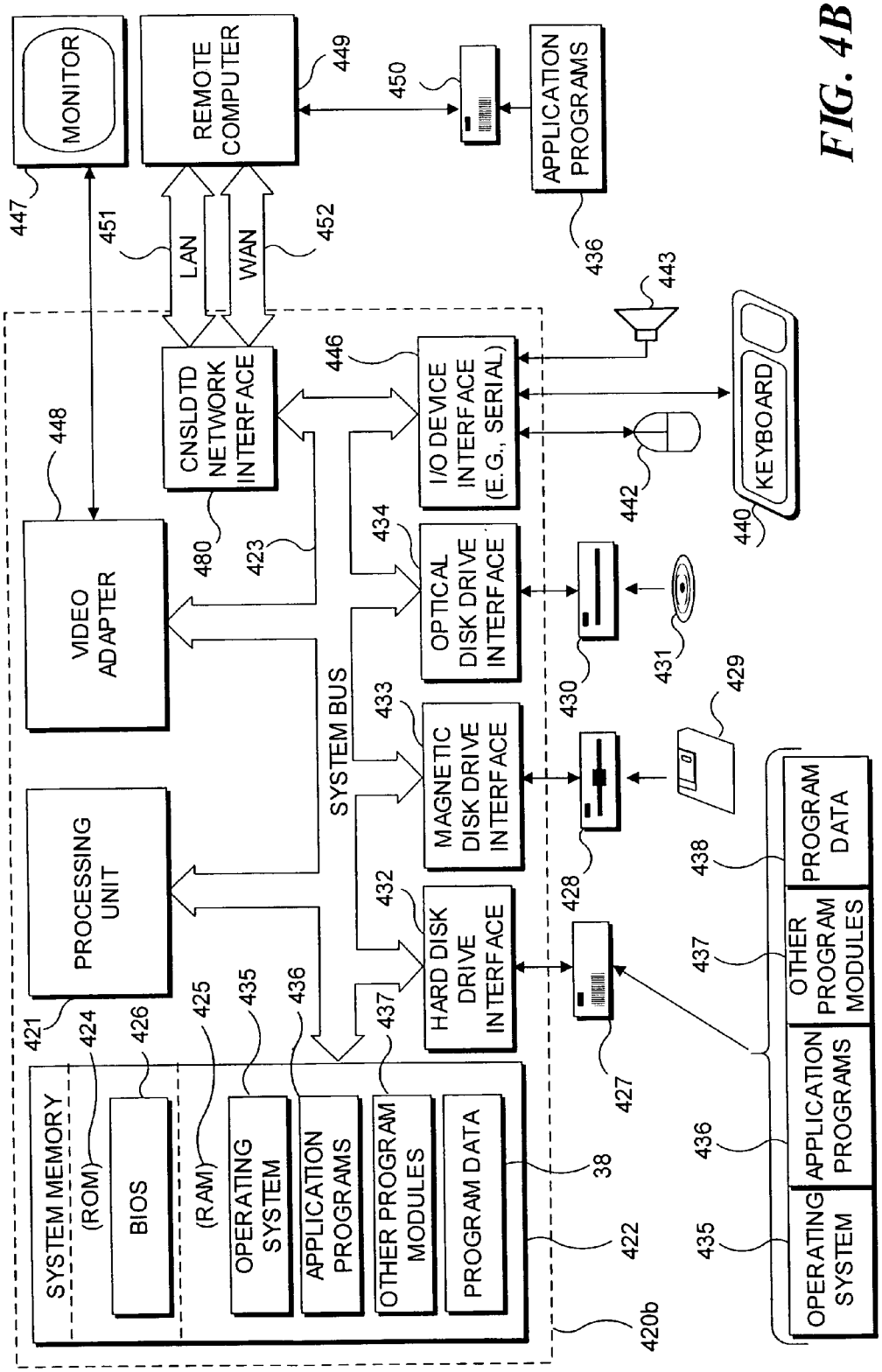
FIGS. 4B and 4C are functional block diagrams of the computing device adapted to include embodiments of the present invention.

As shown in FIG. 4B, using an embodiment of the present invention, a PC 420b communicates with communications systems, such as LAN 451 and WAN 452, using a consolidated network interface 480, which incorporates functions of modem 454 (FIG. 4A) and serial interfacing with modem 454 managed in personal computer 420a by I/O interface 446, as well as functions of network interface 453. This approach simplifies the functional structure of PC 420b and, as described below, simplifies the connection of the PC to communication services and devices.

Figure 4C:
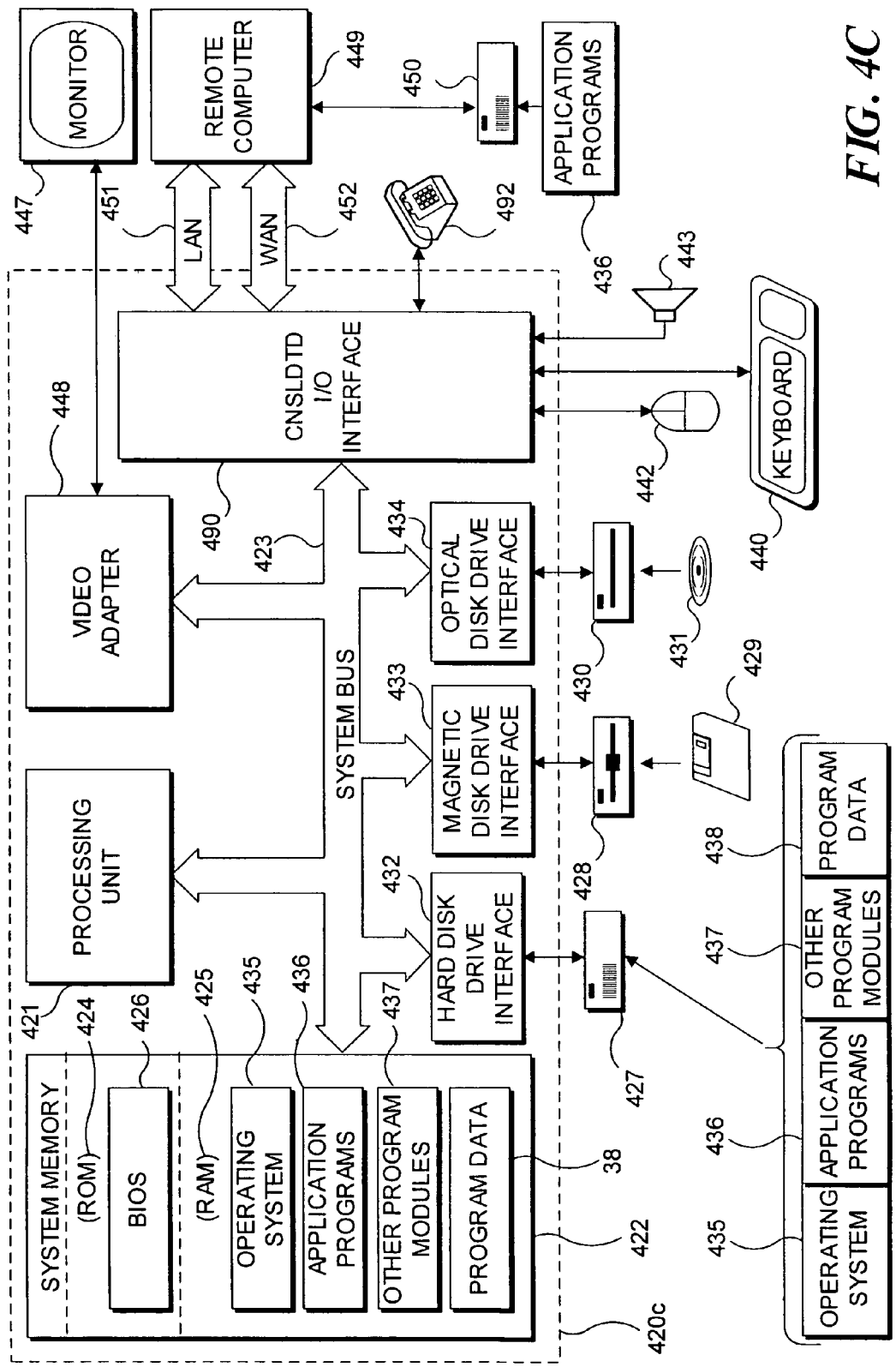

As shown in FIG. 4C, using another embodiment of the present invention, a PC 420c communicates with communications systems and a plurality of input/output devices using a consolidated I/O interface 490. Consolidated I/O interface 490 is operable to communicate with communication systems, such as LAN 451 and WAN 452, and is also operable to couple with a conventional telephone device 492. In one embodiment of the present invention, other I/O devices, such as keyboard 440, pointing device 442, and audio input/output device 443 also engage system bus 324 via consolidated I/O interface 490. The consolidated I/O interface 490 further simplifies connection to communication services and I/O devices, and enables more versatile communication options, as described below.

PC with Universal communication Ports

Figure 3A:
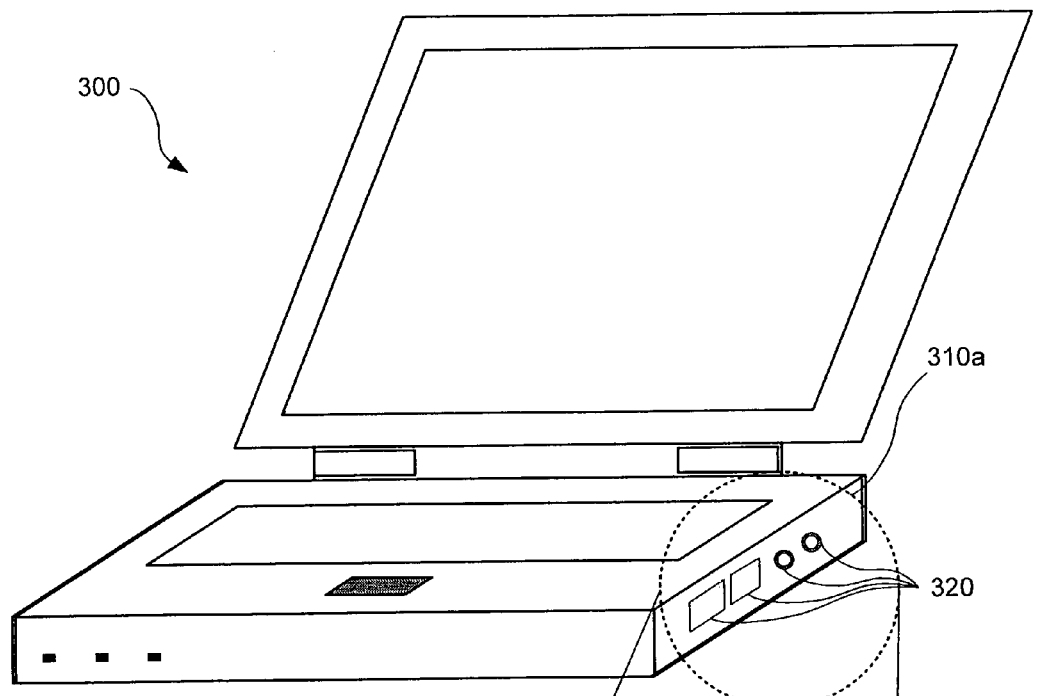
FIG. 3A (Prior Art) is an isometric view of a portable computer and its communication and peripheral ports.
Figure 3B:
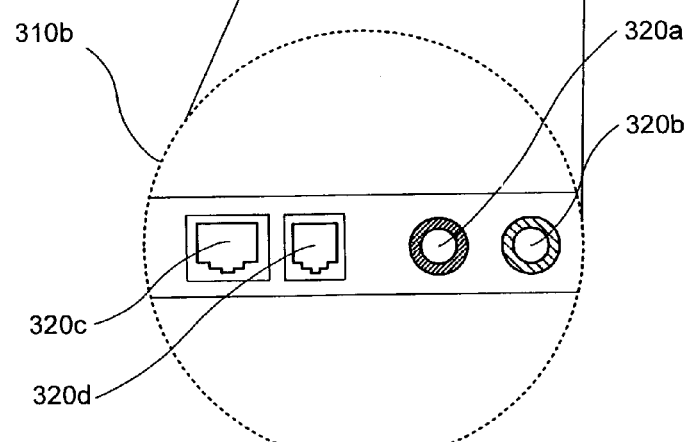
FIG. 3B (Prior Art) is an enlarged view of the communication and peripheral ports of the portable computer of FIG. 3A.
Figure 5A:
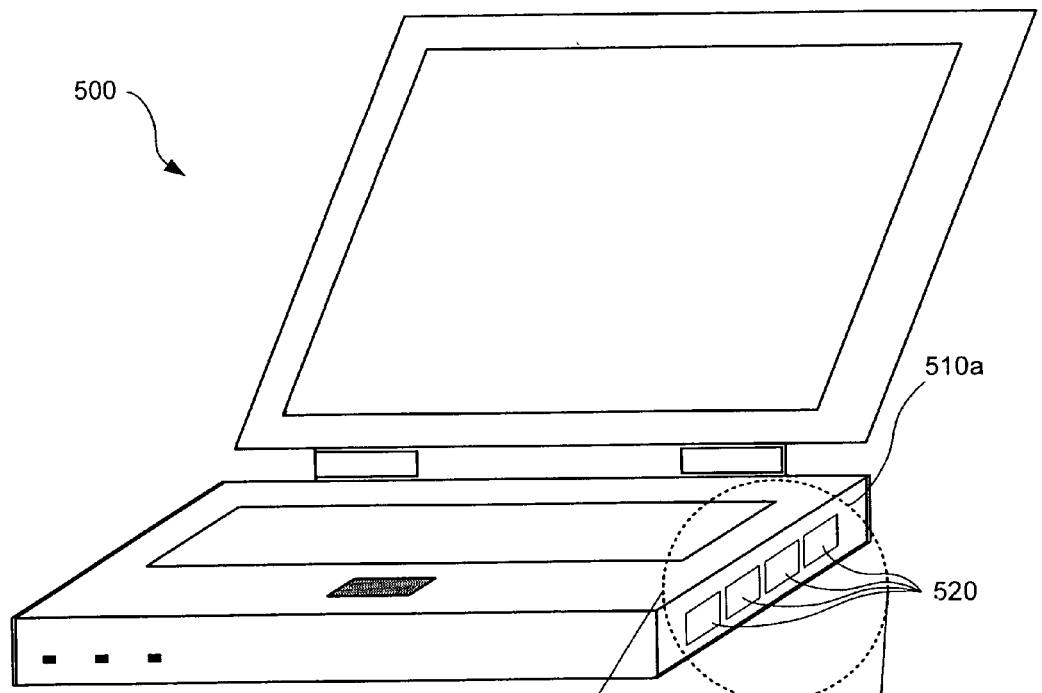
FIG. 5A is an isometric view of a portable computer adapted to use an embodiment of the present invention.

FIG. 5A shows a portable computer 500 that is similar to conventional portable computer 300 (FIG. 3A), except that a connectivity area 510a of portable computer 500 features universal communication ports 520 instead of the range of distinct, I/O-specific dedicated ports 320 used in conventional portable computer 300. As described above, in connecting communications systems or I/O devices to a PC, installers need to be careful to make sure that the appropriate devices are connected to the correct ports. For example, if an RJ-11 telephone connector is mistakenly connected to an RJ-45 Ethernet port, and the microphone and headphone plugs of a headset are mistakenly transposed and plugged into the headphone and microphone jacks, respectively, the communications with the PC will not function as expected, to say the least.

Figure 5B:
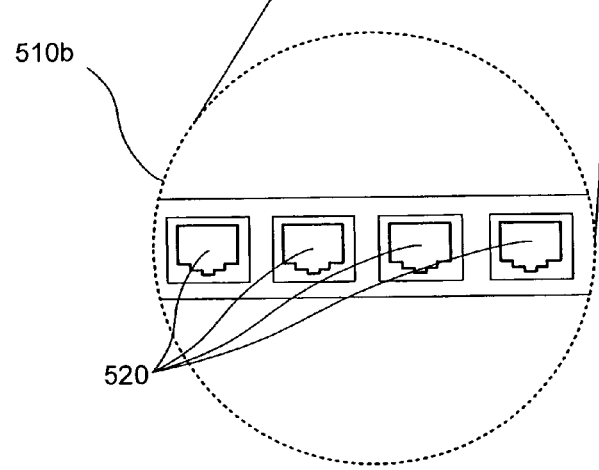
FIG. 5B is an enlarged view of the communication and peripheral device ports of the personal computer using an embodiment of the present invention.

However, using embodiments of the present invention, universal communication ports 520 reduce problems that might be experienced by those attempting to connect PC 500 with communication systems and I/O devices. As shown in the enlarged view of a connectivity area 510b in FIG. 5B, instead of presenting multiple, different, dedicated jacks, the connectivity area includes a plurality of identical universal communication ports 520. One embodiment of a universal communication port 520 features an RJ-45 style port operable to accept a connector supporting up to eight lines. Most PC peripheral devices and communications systems, ranging from headsets and printers to Ethernet adapters and wireless communication adapters, presently can be interfaced with USB connectors that include only four connectors. Thus, an eight-conductor RJ-45 connector is suitable to connect a wide range of communications systems and I/O devices. As described further below, a consolidated network interface 480 (FIG. 4B) or a consolidated I/O interface 490 (FIG. 4C) is operable to detect a wide range of communications systems and I/O devices that foreseeably may be connected to one of universal communication ports 520, and couple and route communications and/or power lines appropriately between the external system or device and the appropriate lines of system bus 423 (FIGS. 4A-4C) and/or power supply lines within the PC.

Exemplary Uses of Embodiments of the Present Invention

Figure 6A:
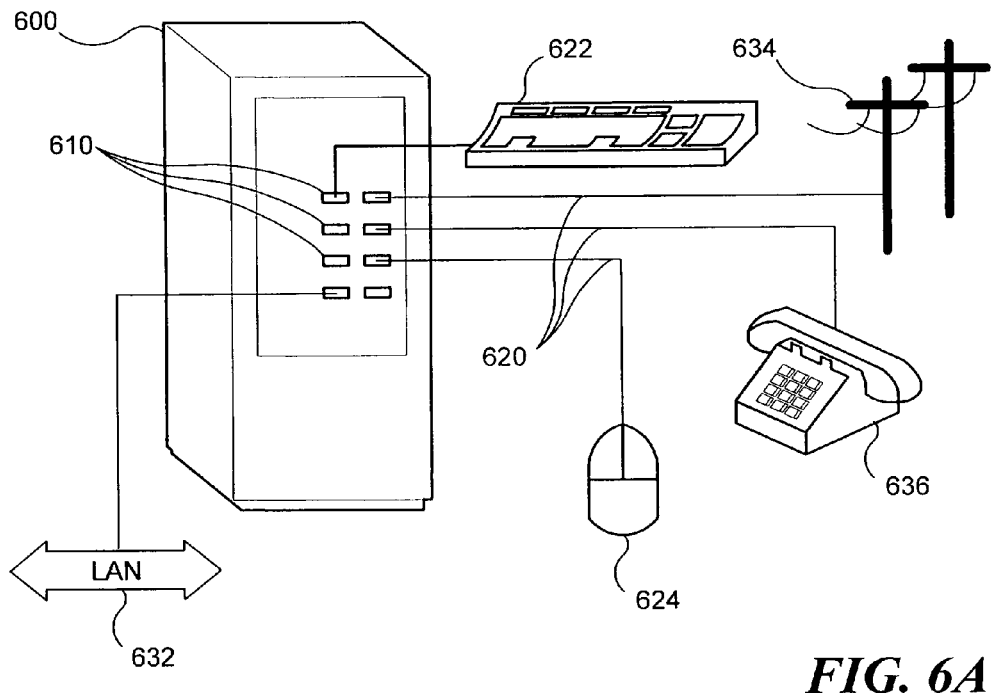
FIGS. 6A and 6B are connection diagrams showing alternative connections of external communications systems and devices connected to the portable computer of FIGS. 5A-5B.
Figure 6B:
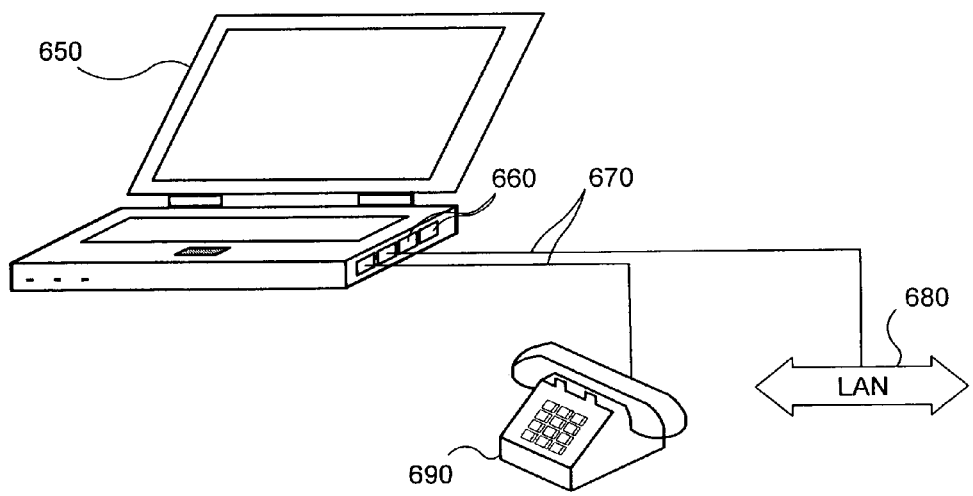

FIGS. 6A and 6B show representative examples in which computers 600 and 650 are being connected to computing systems and I/O devices using an embodiment of the present invention. More specifically, FIG. 6A shows a PC 600 equipped with a plurality of universal communication ports 610. Using universal communication ports 610, PC 600 is coupled via cables 620 with peripherals 622 and 624, communications services 632 and 634, and a telephone device 636. In the illustration of FIG. 6A, universal communication ports 610 present identical physical receptacles, such as RJ-45 jacks. Thus, cables 620 joining communications services 632, peripherals 622 and 624, and telephone device 636 all are provided with connectors configured to be received in the RJ-45 jacks, such as RJ-45 or RJ-11 connectors. As described below, detection logic evaluates one or more electrical characteristics presented by lines connected to each of universal connection ports 610 to determine the nature of the service or device attached to each of these ports. As a result of the determination made by the detection logic, lines presented by the services and devices coupled with universal communication ports 610 are configured and routed to enable communication between the services and systems, and PC 600.

Figure 1:
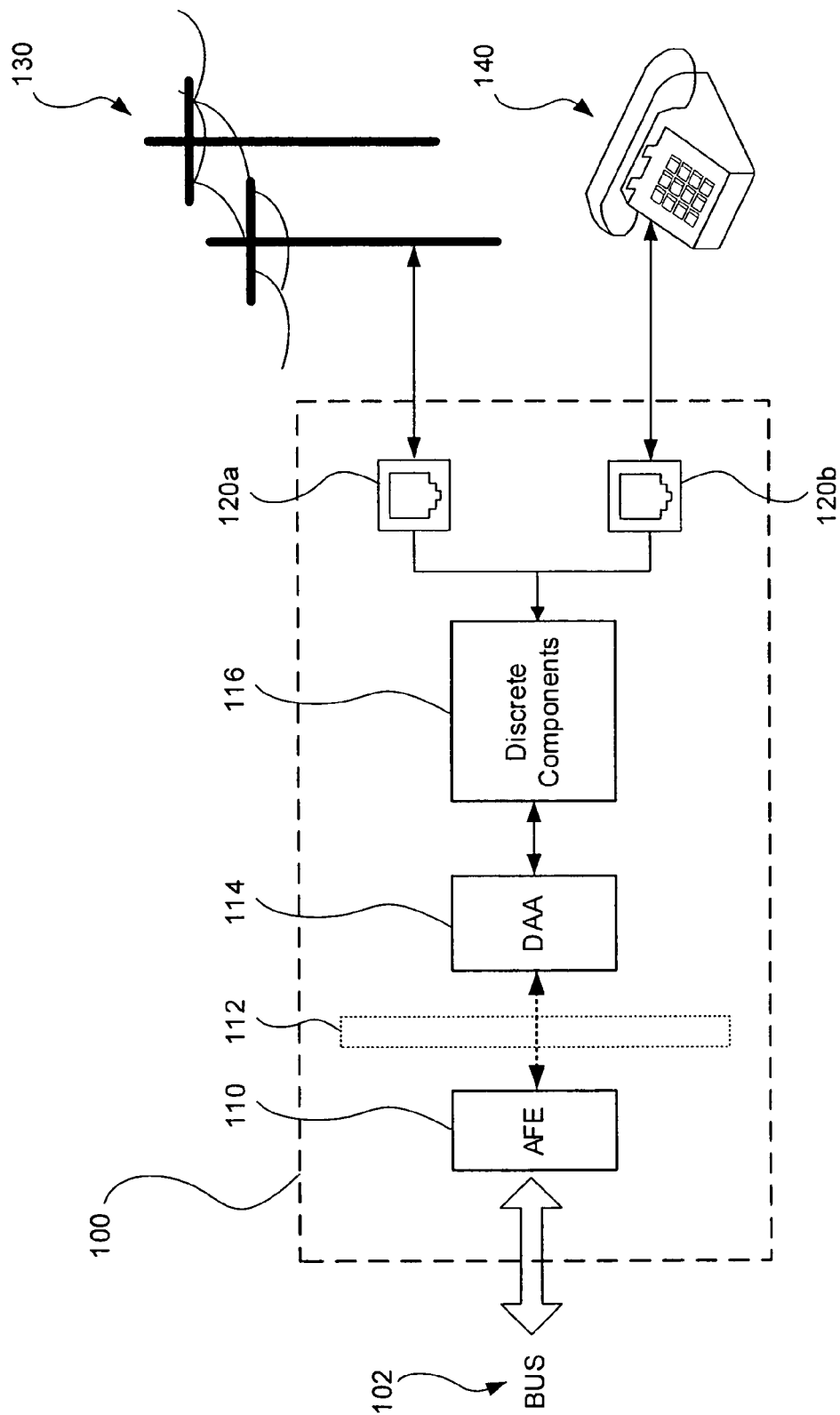
FIG. 1 (Prior Art) is a block diagram of a conventional telephone communications interface used in a personal computing system.
Figure 2A:
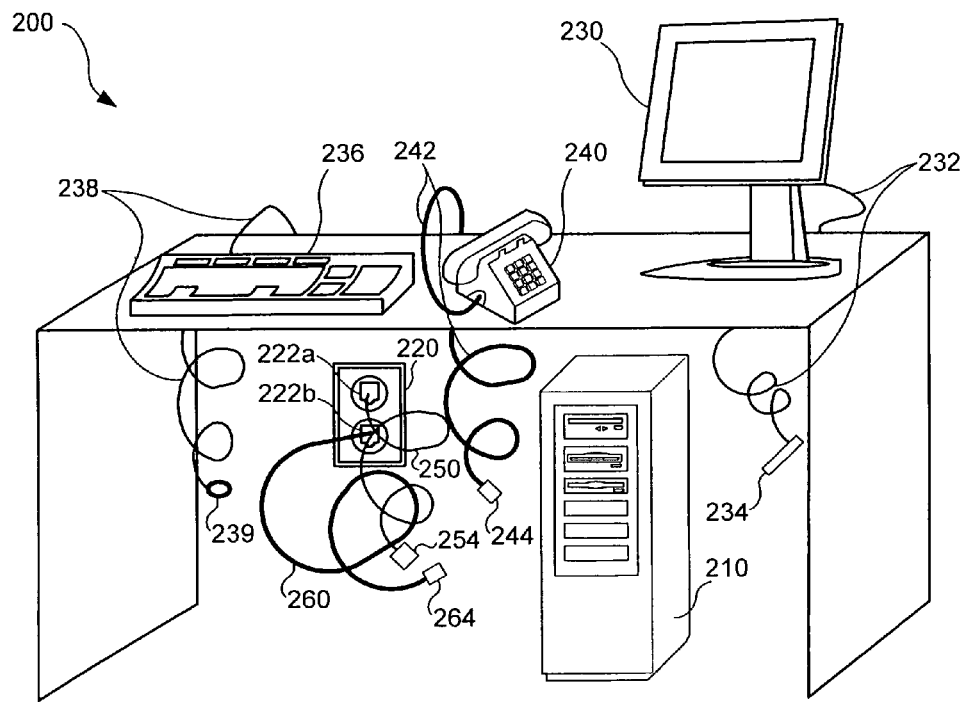
FIG. 2A (Prior Art) is an isometric view of a workstation where a personal computer (PC) and a telephone are being connected to telephone and data networks.
Figures 2B, 2C:
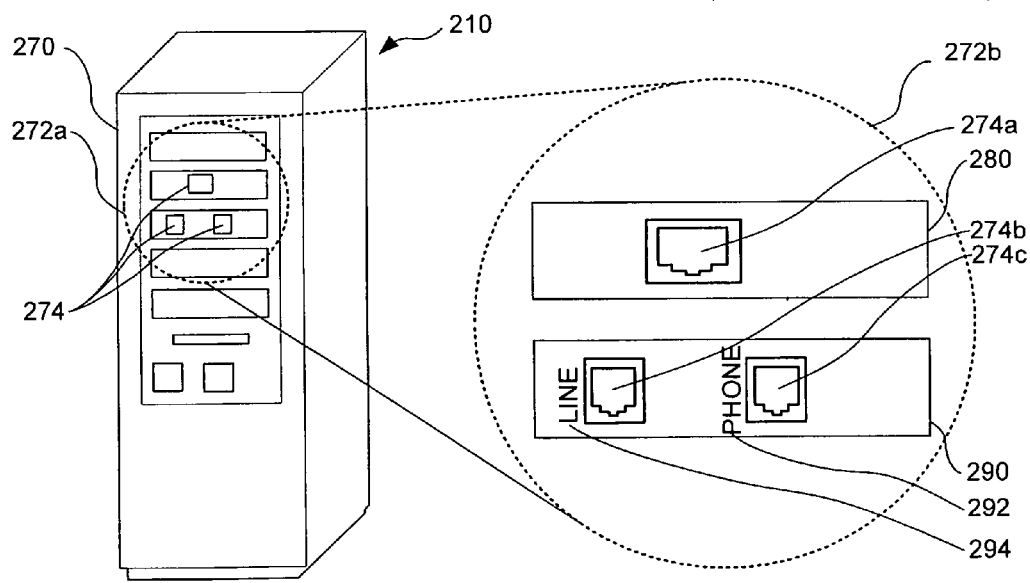
FIGS. 2B and 2C (Prior Art) are isometric views of a rear panel of a PC showing ports for connection of communication systems and devices.

As a result, a person can more conveniently connect services and devices with PC 600. For example, in contrast to the problems described above in connection with installing PC 210 (FIG. 2A), where the installer may have to be very careful to properly couple the services and devices with the appropriate, dedicated jacks on PC 210, an installer or user of PC 600 is spared such travails. Using an embodiment of the present invention, a user can connect cables 620 from a variety of different devices/services, including keyboard 622 and pointing device 624, services such as the Ethernet communication over LAN 632 and a public switched telephone network (PSTN) 634, and even conventional telephone device 636, to any available Universal communication ports 610, in any pattern, combination, or order. The installer or user need not be concerned with making improper connections between devices/services and ports, and thus potentially having to crawl beneath a workstation or other desk with a flashlight or other portable light source to carefully examine jacks and/or port labels—if any are included—on the back of PC 600.

Many conventional PCs incorporate "plug and play," or "UPnP" technology to allow a PC to recognize devices that are connected to appropriate, designated ports if those devices adhere to UPnP standards. However, beyond the "plug and play" standard, embodiments of the present invention present an even more versatile system where installers and users can plug in cables representing a wide range of external communication systems and devices simply by inserting the connector in the most convenient port, without the installer or user having to determine which port is which or take the time and care to make sure the appropriate connector is inserted in the correct port. The computer can then dynamically configure itself to communicate over that service regardless of the specific universal communication port 610 to which the service was connected. Thus, with a minimum of effort, a person can make the necessary connections that enable the person to interact with the computer using keyboard 622 and/or pointing device 624, and can use computer 600 to communicate over LAN 632 and PSTN 634. With telephone device 636 connected to computer 600, when PC 600 is not exchanging information over PSTN 634 or computer 600 is turned off, a user can place telephone calls over PSTN 634. Furthermore, as described further below, a user can use conventional telephone device 636 to communicate over LAN 632 using a voice over Internet protocol (VoIP) or other protocol.

FIG. 6B illustrates a portable computer 650 that is also equipped with universal communication ports 660 to which a number of communication services and/or devices can be attached through cables 670. As in the example of PC 600 (FIG. 6A), portable computer 650 can be coupled with external peripherals such as a keyboard, pointing device, disk drive, etc. using the universal communication ports. Perhaps more importantly for a user, portable computer 650, which may likely be used while traveling at locations remote from a home or office, can be coupled to a variety of communications services, such as a LAN 680. Furthermore, using conventional telephone device 690, a user can communicate over LAN 680 using VoIP.

Being able to connect conventional telephone device to universal communication ports 610 and 660 is significant for a number of reasons. First, unlike embodiments of the present invention, conventional jacks for a telephone device are provided mainly as a convenience feature on prior art portable computers. With a conventional jack for a telephone device, a user can physically connect a telephone device and a modem to a single telephone line at the same time so that the user alternately can use either without needing two wall outlets, or without having to physically connect and disconnect cables to the modem and the telephone device, or without having to provide a separate Y-adapter to enable both devices to be coupled to a single telephone jack at a time. Furthermore, providing a jack for the telephone device allows a modem to ensure that the telephone device is disconnected from the telephone line when the data communication using the modem is occurring to avoid noise that might disrupt data communications. However, conventional jacks do not permit a telephone device to be used for any purpose other than communicating over a telephone line. Conventional systems are not configured to be able to provide power or match the impedances of conventional telephone devices such that telephone devices can be used as I/O devices.

Second, providing a port that enables a conventional telephone device to be used as an audio input/output device for VoIP is very desirable to a user. For example, the user may be a business traveler who, while staying a hotel, may need to make any number of local and/or long distance telephone calls. While a hotel catering to a business traveler may provide high-speed Internet access at no cost or for a nominal flat fee, that same hotel may charge a relatively high fee per call for each local call, and an even much higher rate for direct-dial long distance calls. Unfortunately, even if the traveler uses a conventional calling card or prepaid card, the hotel may charge the traveler for each local call placed to dial the local access number to reach the network associated with the calling card, to say nothing of the inconvenience to the traveler in having to enter the alphanumeric calling card access and account numbers. However, using an embodiment of the present invention, the traveler can disconnect the hotel telephone device from its wall socket, connect it to a universal communication port on the portable computer, connect another universal communication port on the portable computer to the hotel's high-speed Internet service through an Ethernet cable, and place local and long distance calls at no additional charge using a VoIP provider. As previously described, if the universal communication port is configured with an RJ-45 receptacle, the universal communication port can accommodate telephone devices presenting RJ-45 connectors, commonly used on multi-line telephone devices, or even more common RJ-11 connectors used on many home and business telephone devices. Thus, the user can make calls without paying hotel telephone surcharges or having to carry an audio input/output device while on a trip away from the home/office.

Similarly, provision of such a universal communication port can save the cost of adding additional telephone lines. For example, if a household with a single telephone line and Internet service needs an additional telephone line for communication, a computer provided with a universal communication port can be used with conventional telephone devices to access VoIP services to effectively add the benefits of the additional line without the cost. The user need not acquire a special input/output device, and need not pay the installation fee and monthly charges for a second telephone line.

Universal communication ports in accord with this invention also can be used by a business to expand its telephone service. For example, a small business may need a public branch exchange (PBX) system, but be unable to pay for such a system. A telephony card with universal connection ports could be installed on a server at the office, and the ports on the telephony card can then be connected to PSTN lines and/or conventional telephone devices. As more PSTN lines or users are added, each is coupled to an available universal communication port. Thus, whether on the road, at home, or at an office, provision of universal communication ports to enable the connection of communication lines or conventional telephone device to a computing device can save money for the user.

Third, providing a non-dedicated universal communication port that enables connection of a conventional telephone device saves the space and cost associated with providing what may be a little-used jack on a PC. Space constraints are particularly tight on portable computers both internally within the case and, perhaps even more so, on the shell of the case. With a conventional portable computer, three different jacks would have to be provided to enable a user to connect a PSTN line for conventional modem communications, a high speed Internet line (for use instead of the modem when available), and a telephone device. Using an embodiment of the present invention, the use of a conventional telephone device as the audio input/output device for VoIP requires only two of such universal communication ports. If the user has access to wireless high-speed Internet service at home or at the office, or as is provided by many motels/hotels, then only a single universal communication port would be required. Furthermore, a universal communication port that can also communicate with other peripherals may obviate the need and eliminate the cost of providing PS/2 keyboard and pointing device connectors, speaker and microphone connections, and other ports to connect other types of input/output devices or services.

Schematic Diagram of Universal communication Port Controller

FIG. 7 is a schematic diagram a universal communication port controller 700 facilitating connection of a plurality of universal communication ports 710 to a computing system. As described above, in one embodiment of the present invention, universal communication ports 710 are configured as RJ-45 receptacles. A number of networking systems and telephone devices use RJ-45 or RJ-11 connectors. Thus, RJ-45 receptacles can receive lines from many widely used communication services and a variety of different telephone devices. In the embodiment shown, universal communication ports 710 are configured to couple the computing system with a convention Ethernet connection, a Gigabit Ethernet connection (GigE), a Power over Ethernet connection (PoE), an integrated services digital network (ISDN) connection, a digital subscriber line (DSL) connection, a PSTN connection, and/or a conventional telephone device.

In one embodiment of the present invention, universal communication port controller 700 provides two principal functions. First, universal communication port controller 700 examines the connection with any system and/or device that is connected to any universal communication ports 710 to determine whether and how the systems and/or devices can be used with the computing system. Second, when a system or device is usable by the computing system, universal communication port controller 700 appropriate switches and routes the individual signal lines of the services and devices connected to the universal communication ports 710 to the appropriate communications devices associated with the computing system.

The exemplary embodiment shown in FIG. 7 illustrates a system having three RJ-45 universal communication ports 710, each of which supports eight lines or four pairs of conductive lines 711, each of which is received at a switching point 718. Each switching point includes a multi-point multiplexer 719 and protection circuitry 720. Protection circuitry 720 can be of a number of forms that are widely known in the art for protecting low voltage and/or low current circuits from potentially damaging current surges, voltage spikes, or mistakenly applied high current/voltage sources. Protection circuitry is provided to protect both universal communication controller 700 and the computing system from such potentially harmful voltages or currents that are likely to damage the controller or system.

Each switching point 718 also includes a multiplexer 719 that is used to selectively couple signal lines presented by a system or device coupled with one of universal communication ports to appropriate communication circuitry within the computing system. Multiplexers 719 are controlled by a multiplexer control 716 that is associated with detection and switching logic 713.

Detection and switching logic 713, in addition to the multiplexer control 716, includes connection detection circuitry 714 and UCP detection logic 715. In one embodiment of the present invention, connection detection circuitry 714 serves at least two functions. First, connection detection circuitry 714 detects the presence of a connector in a universal communication port. Presence of a connector is detectable by a switch that is disposed adjacent to the port so that insertion of a connector causes contacts of the switch to either open or close, to register that a connector has been inserted into the universal communication port. Alternatively, a photosensor can be disposed to respond to a connector in the universal communication port and thus detect the presence of the connector in the port. Also, periodic testing of one or more of lines 711 of the universal communication port or ports may be conducted such that a change in an electrical property of one or more of the lines indicates a connector is present in the port. Second, once a connector is determined to be present within the universal communication port, connection detection circuitry 714 measures any signals received at lines 711 to derive information about the service and/or device that is coupled with the universal communication port 710. By measuring voltages carried by each of the lines 711, or measuring impedance between pairs of lines 711, various systems and devices are identifiable by UCP detection logic 715. Once a particular system is identified by UCP detection logic 715 as being coupled with a universal communication port, multiplexer control 716 directs the multiplexer 719 to couple lines 711 with the appropriate communication circuitry to facilitate the functionality appropriate to the connected service/device.

Connection detection circuitry 714 is coupled with universal communication port detection logic 715, which responds to measurements made by connection detection circuitry 714 based on control information received from a universal communication port setup and initialization driver 730 and in accord with a software user interface 732. As will be appreciated by those of ordinary skill in the art, instead of creating an application-specific, fixed configuration circuit, universal communication port detection logic 715 receives and processes instructions communicated from driver 730 and software interface 732, enabling universal communication port detection logic 715 to be created and updated more efficiently. Based on the configuration and programming provided by driver 730 and software user interface 732, universal communication port detection logic responds to measurements made by connection detection circuitry 714 and directs multiplexers 719 to selectively couple lines 711 to appropriate communications systems.

The exemplary embodiment of the invention shown in FIG. 7 includes communication circuitry equipped to handle one of five types of connections. A PSTN modem 742 and a DSL modem 744 are provided, both of which are coupled to a digital access arrangement (DAA) 740. DAA 740 correctly routes the connection coupled to the universal communication port to the appropriate modem, selecting between PSTN modem 742 and DSL modem 744.

In addition, an AC97 CODEC 746 is provided and functions as a generally conventional 20-bit audio coder/decoder. Typically, AC97 CODEC 746 engages headsets, microphones, and speakers configured for use with a PC. However, universal communication port controller 700 couples a telephone-to-AC97 converter 722 and adjusts incoming and outgoing signals to and from PC in regard to a conventional telephone device such that the telephone device microphone and speaker may be used for computer audio input and output, respectively.

An Ethernet adapter 750 is also provided, as it is in many PCs. A difference between an embodiment of the present invention and the Ethernet adapter on conventional computers is that, in conventional computers, a dedicated Ethernet port is provided and is coupled to Ethernet adapter 750. By contrast, using embodiments of the present invention, Ethernet adapter 750 may be coupled to an Ethernet connection and to other devices and services, without the cost and space of including a dedicated, Ethernet-only port, as is the case in the prior art.

An ISDN terminal adapter 760 also is provided for use with an integrated services digital network. Because ISDN signal may be supplied over conventional telephone lines, in one embodiment of the present invention, a galvanic isolation ring protection circuit is included to protect ISDN terminal adapter 760 from damage that might be sustained due to the relatively high voltage presented by a telephone ring signal. Generally, universal communication port controller 700 is isolated from other PC subsystems by a PC isolation barrier 770 to protect against potentially harmful voltage surges.

Determining which communications circuit (i.e., deciding between DAA 740 and PSTN modem 742 or DSL modem 744, telephone-to-AC97 converter 722 and AC97 CODEC 746, Ethernet adapter 750, and ISDN terminal adapter 760) is coupled to lines 711 is the task of UCP detection logic 715 in combination with connection detection circuitry 714. For example, if an RJ-45 jack configuration is used for universal communication ports 710, an RJ-45 connector presents eight lines, i.e., pins 1 through 8, that are seen when viewing an end of a standard RJ-45 conductor with the exposed conductors facing down and the locking tab facing up, from the perspective of the receiving jack. Whether the system or device associated with the presented connector is a network, and which type of network, or whether a telephone device, is determinable by measuring the electrical characteristics of one or more of the pins. TABLE 1 shows a typical usage of pins 1 through 8 according to standards used by a variety of different systems:

the universal communication port is for a PSTN connection. Similarly, if it is determined that a voltage of −48 volts is registered between pin 6 and pin 3, a secondary PSTN line is presented by the connection to the universal communication port. In either case, UCP connection logic 715, based on the data provided by connection detection circuitry 714, determines that a PSTN system is connected to the port, and directs multiplexer control 716 to switch multiplexer 719, which is associated with universal communication port 710, so that it is configured for properly receiving the PSTN connector signals, to couple lines 711 associated with the universal communication port to DAA 740.

Alternatively, if a voltage of +48 volts is measured relative to ground at pins 4 or 5, a voltage of −48 volts is measured relative to ground at pins 7 and 8, or a voltage differential of approximately 96 volts is measured between either of pins 4 and 5 and either of pins 7 and 8, UCP connection logic 715 determines that a PoE system connector is connected to the universal communication port. UCP connection logic 715 thus directs multiplexer control 716 to switch multiplexer 719, which is associated with universal communication port 710 that is receiving the PoE connector, to couple lines 711 that are associated with universal communication port 710 to Ethernet adapter 750. At the same time, further switching controls (not shown) may be directed to route power from pins 4, 5, 7, and 8 to a power module that is designed to draw power from the PoE connector. As a further alternative, if a signal voltage between ±0.833 volts and ±2.5 volts is detected between either pins 3 and 6 or pins 4 and 5 by connection detection circuitry 714, universal communication port detection logic 715 determines that the connector coupled to the port is for an ISDN line.

If none of these voltages are detected, connection detection circuitry 714 may be directed to perform a resistance test between pairs of pins. Thus, for example, upon measuring a DC resistance between pins 1 and 2 or between pins 3 and 6 in the range from about 1 ohm, which is attributable to a standard Ethernet isolation transformer, and 21 ohms, attributable to a run of category 5 cable, the logic would determine that the connector coupled to the universal communication port represents an Ethernet cable. On the other hand, a resistance between pins 3 and 4 that ranges between about 200 ohms and 300 ohms may indicate the connector coupled to the universal communication port is associated with a telephone device. In addition, if no such voltages or DC resistances are detected, an impedance measurement between pins 3 and 4 may be performed using a source having a frequency in the range of 200 Hz to 3400 Hz. A measurement of approximately 600 ohms in this frequency range also would indicate the presence of a telephone device coupled to the universal

TABLE 1

| | Pin | | | | | | | |
|---|---|---|---|---|---|---|---|---|
| | 1 | 2 | 3 | 4 | 5 | 6 | 7 | 8 |
| Ethernet | Transmit+ | Transmit− | Receive+ | Unused | Unused | Receive− | Unused | Unused |
| GigE | BI_DA+ | BI_DA− | BI_DB+ | BI_DC+ | BI_DC− | BI_DB− | BI_DD+ | BI_DD− |
| PoE | Transmit+ | Transmit− | Receive+ | +48 v | +48 v | Receive− | −48 v | −48 v |
| ISDN | Pwr +3 v | Pwr −3 v | Tx/Rx+ | Rx/Tx+ | Rx/Tx− | Tx/Rx− | Pwr −2 v | Pwr +2 v |
| DSL/ PSTN | Unused | Unused | Tip 2 | Ring 1 (−48 v) | Tip 1 (Gnd) | Ring 2 | Unused | Unused |

Thus, for example, if it is determined that pin 4 registers a voltage of −48 volts relative to pin 5, which is a ground pin, this voltage reading indicates that the connector coupled to communication port. If a telephone device is detected by connection detection circuitry 714, universal communication port detection logic 715 directs multiplexer control 716 to switch the multiplexer 719 associated with the universal communication port 710 appropriately couple the telephone device connector signals to lines 711, which are associated with universal communication port 710 when connected to telephone-to-AC97 converter 722.

In addition, other voltages, resistances, and/or impedances can be measured to determine the presence of other types of devices or services that might be coupled to the universal communication port. For example, if keyboards, pointing devices, headsets, microphones, printers, and other peripherals are equipped with connectors configured to engage the universal communication ports 710, universal communication port detection logic 715 may also be programmed to test for the presence of these devices. Upon identifying a particular device, the lines 711 associated with the universal communication port 710 where the signature electrical characteristics were detected may be selectively coupled to the communications interface or other interface (not shown) that is appropriate for the device thus detected. For example, if impedance measurements indicated that the connector coupled to the universal communication port is associated with a headset having headphones and a microphone, universal communication port detection logic 715 may cause a multiplexer to couple lines 711 that are associated with the universal communication port 710 to AC97 CODEC 746 directly, bypassing unneeded telephone-to-AC97 converter 722. In addition, system power may be provided via a connector receivable in a universal communication port 710, with the power source being identifiable by a characteristic voltage that has been measured at expected lines 711.

It should also be appreciated that, with price-performance improvements in microprocessors and memory devices, instead of using hardware-based communications subsystems, such as a hardware-based PSTN modem 742 or Ethernet adapter 750, these functions could instead be implemented in software executable by a system processor in accord with machine executable instructions that are stored in memory.

Thus, from the foregoing examples, it can be seen that by executing tests of electrical characteristics of signal lines coupled to universal communication ports and connected with lines 711, external communications systems, telephone devices, and other devices and services can be identified and automatically connected with appropriate interfaces implemented in hardware or software, to achieve the required functionality of the connected device or service. Therefore, connectivity and communications between one or more external devices and/or services and a computing system may be supported without having to provide dedicated ports for each of the different devices or services, and without an installer having to correctly couple the appropriate connector to a specific dedicated port for that device or service.

To further improve the connection process for the user, a status indicator may be associated with each of universal communication ports 710. In one embodiment of the present invention, each of the status indicators includes one or more light emitting diodes (LEDs) presenting a visible signal of a status of the connection between the universal communication port and the connector for the external service or device. As is described in further detail below in connection with FIG. 8, in one embodiment of the present invention, the status indicator presents a green light if universal communication port controller 700 has identified the protocol or device, and established a communications link with the external service or device. On the other hand, if universal communication port controller 700 detects a connection, but is unable to recognize the protocol or device, the status indicator presents a red light to signal that it the connection is not usable. As a further alternative, if universal communication port controller 700 is unable to determine the type of device or system, either at all times or upon detecting the presence of a connector coupled to universal communication port 710, the status indicator may present a yellow or amber light. The yellow or amber light being energized indicates that a connection may be possible, but that connection has not been made. Thus, for example, if the user has connected a network cable to the universal communication port, but the user has not connected the other end of the network cable to a network port, the status indicator may present an amber or yellow light to show that the connector was detected in the universal communication port, but is for an underdetermined device or system.

Status indicators thus provide visual feedback to the user or installer that a service or device has been properly coupled to the PC or other computing device. Alternatively, should the user working with the computing system be unable to effect the desired connection to a communication device or service, the user can check the status indicators to determine if the communications problem is the result of a failed connection, or if the problem might be with the communications software, or some other source.

Although not shown in FIG. 7, additional devices may be used to draw power from suitable connections and/or to enable persistent switching, even when the computing system is not powered up. For example, if a PoE connection is detected in the universal communication port, power can be drawn from pins 4, 5, 7, and 8 of the connection and converted as necessary, to supply some or all of the power needs for certain component(s) of the computing system. Alternatively, if it is determined that a PSTN line is connected to one of the universal communication ports and a conventional telephone device is connected to another, power supplied by PSTN line at pins 4 and 5 can be used to couple the telephone device to the PSTN line when the computing system is powered off. Thus, without having to remove or change connections, a user would still be able to operate the telephone normally, although the computing system is powered off.

Logical Steps for Evaluating and Signaling Connections

FIG. 8 is a flow diagram 800 illustrating the logical steps for evaluating systems and devices connected to the universal ports, configuring the communications adapter to engage the system detected, and/or communicate to a user a status of each of the ports. As previously described in connection with FIG. 7, presence of connectors for external systems and devices is performed by measuring electrical characteristics of one or more signal lines presented by the connectors, as determined by measuring electrical properties of lines associated with the universal communication ports. Flow diagram 800 describes an exemplary series of logical steps for detecting and responding to connectors engaging universal communication ports.

Flow diagram 800 begins at a step 802. At a step 804, it is determined if a connector is detected in any universal communication port(s). As described above, connector detection for the universal connection ports may be performed with a switch, a photosensor, and/or by continually testing electrical properties of lines coupled with the universal communication ports to determine if a connector has engaged one of the universal communication ports. At a decision step 806, it is determined if a state change is detected, signaling that a connector has been coupled into one of the universal communication ports. If not, flow diagram 800 loops to step 804 to continue determining if a connector has been detected in any universal communication port(s). On the other hand, if it is determined at decision step 806 that a state change has been detected, indicating a connector may be present in one or more of the universal communication ports, flow diagram 800 proceeds to a step 808 where a line type determination is activated.

At a decision step 810, it is determined if an analog line is detected in the universal communication port where a connection was noted. If so, at a decision step 812, it is determined if the line is a PSTN line by testing at least one electrical characteristic of one or more signal lines presented by the connector, for example, by determining if between pin 4 and pin 5, a voltage of about −48 volts is detected. If it is determined at decision step 812 that the connector presents a PSTN line, at a decision step 814, it is determined if the line is a user interface (UI) telephone configured for use as an input output device for broadband telephony. If so, at a step 816, the multiplexer control causes a multiplexer to couple the UI telephone-to-AC97 CODEC 746 (FIG. 7), bypassing telephone-to-AC97 converter 722. Although a route bypassing telephone-to-AC97 converter 722 is not shown in the schematic diagram of FIG. 7, it will be appreciated that telephone-to-AC97 converter 722 may be configured to be selectively activated by multiplexer control 716 and thus, be automatically bypassed unless telephone-to-AC97 converter 722 is activated. Alternatively, multiplexers 719 could be configured to add another selectable path, or an additional, secondary multiplexer, which is directed by multiplexer control 716, could be inserted as a front-end to telephone-to-AC97 converter 722, to cause telephone-to-AC97 converter 722 to be bypassed. On the other hand, if it is determined at decision step 814 that the line previously identified as a PSTN is not a UI telephone, at a step 818, the multiplexer control causes a multiplexer to couple the line to DAA 740, to determine whether the line is coupled with PSTN modem 742 or DSL modem 744.

Conversely, if it is determined at decision step 812 that a line coupled to the universal communication port is not a PSTN line, at a decision step 820, it is determined if the connector is associated with a telephone. If so, at a step 822, a multiplexer is directed to couple the telephone to the telephone communications subsystem. At a decision step 824, it is determined if the telephone detected is a UI telephone device. If so, the telephone device is coupled directly with DAA 740 (FIG. 7) as described above. However, if it is determined that the telephone device is not a UI telephone, it is assumed that the telephone device is a conventional telephone. Thus, at a step 830, telephone-to-AC97 converter 722 is activated (or the multiplexer previously described for bypassing telephone-to-AC97 converter is not used).

Whether the line has been determined to be a UI telephone, a conventional telephone, or a PSTN line, once the lines associated with the universal communication port coupled with the connector have been routed, at a step 860, a connection indicator is set to a connected status. As described above, the connection indicator may include a green LED or another indicator to communicate to the user or installer that the port has recognized the service or device represented by the connector and has configured the communications hardware to communicate with the service or device. Once the connection indicator status is set, the logic of the flow diagram ends at a step 890.

At decision step 810, if it was determined that the connector is associated with an analog line, and it was determined at decision step 812 that the connector was not associated with a PSTN line, and it was determined at decision step 820 that the connector was not associated with a recognized telephone device, flow diagram 800 proceeds to a step 836 for a connection test. The connection test may include measuring electrical characteristics of one or more of the lines associated with the universal communication port to which the connector has been coupled, to determine whether the connector is associated with a identifiable service or device. At a decision step 838, it is determined if the connection test has indicated whether a connection to a service or device was found. Thus, for example, if either a voltage and/or an impedance are/is measured on the analog line, but neither measurement is in accord with one of the expected values (or range of values) or protocols, the logic determines that the connector is associated with a service or device, but because the parameters presented by the connector are not in an expected range and/or are not understood, the status indicator is set to "connected but not functional" at a step 870. The status indicator may include a yellow or amber light to signal to the user or installer that a connection with some sort of device or service has been made, but communication with that device or system is not possible. Alternatively, if at decision step 838, no connection is detected, e.g., if no voltage or current is detected, or if an infinite impedance is measured, the connector apparently does not represent any service or device that the logic can accommodate. As a result, at step 880, the connection indicator is set to a "no connection status," such as by displaying a red light. For example, if a connector is coupled to one of the universal communication ports, but the other end is not plugged into a telephone device, telephone jack, or network jack, the connection indicator signals that there is a problem, which the user or installer may be able to correct. In either case, once again after the connection indicator status is set at step 870 or step 880, and the flow diagram ends at step 890.

Referring back to decision step 810, if it is determined that an analog line is not detected, at decision step 826, it is determined if the line is an ISDN line. As described above in connection with FIG. 7 and TABLE 1, an ISDN line may be identified by a signal voltage ranging between ±0.833 volts and ±2.5 volts that is detected between either pins 3 and 6, or between pins 4 and 5. If it is determined at this decision step that the connector represents an ISDN line, a multiplexer associated with the universal communication port receiving the connector for the ISDN line is switched to couple the lines to the ISDN terminal adapter. At a step 860, the connection indicator status is set to connected status, and the logic of the flow diagram ends at step 890.

Similarly, if it is determined at decision step 826 that the line is not an ISDN line, at a decision step 832, it is determined if the connector represents an Ethernet connection. As described above, an Ethernet connection may be indicated by a DC resistance between pins 1 and 2 or pins 3 and 6 ranging between about 1 ohm, which attributable to a standard Ethernet isolation transformer, and about 21 ohms, which is attributable to a run of category 5 cable. If an Ethernet connection is detected, at a step 834, a multiplexer associated with the universal communication port receiving the connector for the Ethernet line is switched to couple the lines of the universal communication port to the Ethernet adapter. At step 860, the connection indicator status is set to "connected status," and the logic of the flow diagram ends at step 890. In addition, although not shown in flow diagram 800, if the line is determined to be an Ethernet line, additional steps can be added to determine if the Ethernet line coupled to the universal communication port is a PoE connection, so that power can be drawn from the connection.

If at decision steps 826 and 832 it was determined that the line was neither an ISDN nor an Ethernet line, respectively, at step 834, a connection test is performed and, at decision step

836, it is determined if any connection to a system or device is detected, as described above. If a connection, albeit an unrecognized connection, is found, at a step 870, the connection indicator is set to a "connected but not functional" state, and the logic of flow diagram 800 ends at step 890. On the other hand, if no connection is detected, at a step 880, the connection indicator is set to a "no connection state," and the logic of flow diagram 800 ends at step 890.

As described above in connection with FIG. 7, some of the steps in flow diagram 800 may be default steps that are enabled by power received from the connection. For example, if a telephone device and a PSTN line are connected to two universal communication ports, the telephone device and PSTN line may be coupled in communication, as a default, so that the telephone can be used normally over the PSTN line without disconnecting either from the universal communication ports of the computing system. The default connection may be overridden or otherwise switched when the computing system determines that the PSTN line is to be used for data communications, or when the telephone device is to be used for VoIP, etc.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for facilitating communication between a computing system and an external system using a universal communication port, comprising the steps of:
    equipping the computing system with at least one universal communication port presenting a plurality of coupler lines configured to engage a connector associated with one of a plurality of compatible external systems and presenting a plurality of connector lines for coupling the external system to the computer system, the universal communication port being configured to receive and initialize one of the plurality of compatible external systems, wherein at least two of the external systems include different connector lines, the different connector lines including different data or power line associations, the universal communication port being further configured to accept a plurality of different connector types;
    determining that an external system's connector has been engaged with the with the universal communication port such that at least a first portion of the universal communication port's coupler lines are electrically connected to at least a portion of the external system's connector lines;
    performing an evaluation of at least one electrical property manifested in the first portion of coupler lines to determine whether data or power characteristics of the external system are identifiable from among the plurality of known compatible external systems with which the computing system can automatically interface using the universal communication port;
    based on the evaluation, detecting which external system has been connected to the universal communication port and determining whether the port's data or power line associations are properly routed for communication with the external system; and
    when the evaluation indicates the external system is among the known compatible external systems with which the computing system can automatically interface using the universal communication port, automatically routing at least a second portion of the coupler lines to a corresponding converter subsystem according to the detected data or power line associations, the converter subsystem corresponding to the detected external system, the subsystem being configured to interface the computing system with the external system.

2. The method of claim 1, wherein the step of performing the evaluation of the at least one electrical property of at least one of the first portion of coupler lines includes the step of determining at least one of:
    (a) whether an analog signal is carried on the first portion of the coupler lines;
    (b) whether a digital signal is carried on the first portion of the coupler lines;
    (c) a voltage carried between lines in the first portion of the coupler lines;
    (d) a resistance between lines in the first portion of the coupler lines; and
    (e) an impedance between lines in the first portion of the coupler lines.

3. The method of claim 2, wherein the step of performing the evaluation includes the step of identifying the external system as one of:
    (a) a public switched telephone network, wherein the second portion of the conductor lines includes connector lines used by the public switched telephone network and the subsystem with which the second portion of the conductor lines is selectively interconnected includes a modem;
    (b) a conventional telephone device, wherein the second portion of the conductor lines includes connector lines used for audio input and output, and the subsystem with which the second portion of the conductor lines is selectively interconnected includes a telephone-to-AC97 converter and an AC97 CODEC;
    (c) a user interface telephone device configured to be used as an audio input or output device for a computing device, wherein the second portion of the conductor lines includes connector lines used for audio input and output, and the subsystem with which the second portion of the conductor lines is selectively interconnected with the AC97 CODEC;
    (d) an integrated services data network, wherein the second portion of the conductor lines includes connector lines used for integrated services data network communication and the subsystem with which the second portion of the conductor lines is selectively interconnected includes an integrated services data network terminal adapter;
    (e) one of an Ethernet network and a Gigabit Ethernet network, wherein the second portion of the conductor lines includes connector lines used for Ethernet communication, and the subsystem with which the second portion of the conductor lines is selectively interconnected includes an Ethernet adapter;
    (f) a power source, wherein the second portion of the conductor lines includes power lines, and the subsystem with which the second portion of the conductor lines is selectively interconnected includes a power receiver; and
    (g) a computer input or output device, wherein the second portion of the conductor lines includes connector lines used for input or output devices, and the subsystem with which the second portion of the conductor lines is selectively interconnected includes an input or output interface.

4. The method of claim 3, wherein the coupler includes a jack and the connector includes a plug configured to be received within and electrically mate with the jack.

5. The method of claim 4, wherein the jack includes an RJ-45 jack presenting a plurality of pins configured to receive electrical signals from the plug, and the plug includes one of:
   (a) an RJ-45 plug; and
   (b) an RJ-11 plug.

6. The method of claim 5, wherein the step of identifying the external system as the public switched telephone network is made by detecting a predefined voltage between a coupler line engaging pin 4 and a coupler line engaging pin 5.

7. The method of claim 5, wherein the step of identifying the external system as the conventional telephone device is made by detecting a predefined resistance between the coupler line engaging pin 3 and the coupler line engaging pin 4.

8. The method of claim 5, wherein the step of identifying the external system as the integrated services data network is made by detecting:
   (a) a voltage in a predefined range between a coupler line engaging pin 3 and a coupler line engaging one of pins 5 and 6; and
   (b) a voltage in a predefined range between coupler line engaging pin 4 and a coupler line engaging one of pins 5 and 6.

9. The method of claim 5, wherein the step of identifying the Ethernet network is made by detecting:
   (a) a predefined range of resistance between a coupler line engaging pin 1 and a coupler line engaging one of pins 3 and 6; and
   (b) a predefined range of resistance between a coupler line engaging pin 2 and a coupler line engaging one of pins 3 and 6.

10. The method of claim 5, wherein the step of identifying the Power over Ethernet network is made when the coupler line:
    (a) engaging pin 4 registers a voltage differential of approximately .+−.48 volts relative to the second coupler line engaging one of pins 7 and 8; and
    (b) engaging pin 5 registers a voltage differential of approximately .+−.48 volts relative to the second coupler line engaging one of pins 7 and 8.

11. The method of claim 5, wherein the step of identifying the Gigabit Ethernet network is made by detecting substantially a zero direct current voltage between a coupler line engaging pin 4 and a coupler line engaging pin 5.

12. The method of claim 1, further comprising the step of providing a connection status indication, including at least one of:
    (a) an indication that the external system is successfully automatically interfaced with the computing system using the coupler;
    (b) an indication that the external system was detected, but the external system was not successfully automatically interfaced with the computing system using the coupler; and
    (c) an indication that the external system is not among those known to be capable of automatically interfacing with the computer system using the coupler.

13. The method of claim 12, wherein the step of providing the connection status indication includes the step of energizing lights of different colors.

14. The method of claim 1, further comprising the step of providing the computing system with a plurality of couplers, each of the plurality of couplers presenting a plurality of coupler lines.

15. The method of claim 14, wherein the step of performing the evaluation determines that a telephone device is connected with a first coupler and that a public switched telephone network is connected with a second coupler, further comprising the step of selectively interconnecting the coupler lines between the first coupler and the second coupler to enable the telephone device to be used with the public switched telephone network when the computing system is not using the public switched telephone network for data communication.

16. The method of claim 15, further comprising the step of drawing power from the public switched telephone network when the computing system is powered down, to maintain an interconnection between the coupler lines of the first coupler and the second coupler.

17. The method of claim 14, wherein the step of performing the evaluation determines that a telephone device is connected with a first coupler and that a broadband Internet connection is connected with a second coupler, further comprising the step of configuring the telephone device to serve as an input or output device for Voice over Internet Protocol that is conveyed over the broadband Internet connection.

18. The method of claim 1, wherein the at least one subsystem that is configured to facilitate interfacing the computing system with the external system is implemented in at least one of:
    (a) dedicated hardware; and
    (b) machine executable instructions that are executable by a processor.

19. A method for facilitating communication between a computing system and an external system, comprising the steps of:
   equipping the computing system with at least one universal communication port presenting a plurality of coupler lines configured to engage a connector associated with one of a plurality of compatible external systems and presenting a plurality of connector lines for coupling the external system to the computer system, the universal communication port being configured to receive and initialize one of the plurality of compatible external systems, wherein at least two of the external systems include different connector lines, the different connector lines including different data or power line associations, the universal communication port being further configured to accept a plurality of different connector types, the external system including one of:
       a public switched telephone system;
       a telephone device; and
       a network connection;
   determining that an external system's connector has been engaged with the with the universal communication port such that at least a first portion of the universal communication port's coupler lines are engaged by at least a portion of the external system's connector lines;
   performing an evaluation of at least one electrical property of the at least one of the first portion of the coupler lines to identify which external system has engaged the universal communication port and whether the port's data or power line associations are properly routed for communication with the external system; and
   based on the identification of the external system, automatically routing a second portion of the coupler lines to a corresponding converter subsystem according to the detected data or power line associations, the converter subsystem corresponding to the identified external system, the subsystem being configured to interface the computing system with the external system, such that:
when the external system includes a public switched telephone network, the second portion of the coupler lines is interconnected with a telephone interface;
when the external system includes a telephone device, the second portion of the coupler lines is interconnected with a telephone converter enabling the telephone device to be used as an input or output device for a computing system application; and
when the external system includes a network connection, the second portion of the coupler lines is interconnected with a network adapter that is configured to enable the computing system to communicate over the network connection.

20. The method of claim 19, wherein the coupler includes a jack and the connector includes a plug configured to be received within and electrically mate with the jack.

21. The method of claim 20, wherein the jack includes an RJ-45 jack presenting a plurality of pins configured to receive electrical signals from the plug, and the plug includes one of:
(a) an RJ-45 plug; and
(b) an RJ-11 plug.

22. A system for facilitating communications with an external system, comprising:
(a) at least one user input device;
(b) a display screen;
(c) a processor;
(d) a memory;
(e) a bus operably coupling the user input device, the display screen, the processor, and the memory; and
(f) an input or output interface in communication with the bus, the input/output interface comprising:
(i) at least one universal communication port presenting a plurality of coupler lines configured to engage a connector associated with one of a plurality of compatible external systems and presenting a plurality of connector lines for coupling the external system to the computer system, the universal communication port being configured to receive and initialize one of the plurality of compatible external systems, wherein at least two of the external systems include different connector lines, the different connector lines including different data or power line associations, the universal communication port being further configured to accept a plurality of different connector types;
(ii) a controller configured to:
determine that an external system's connector has been engaged with the with the universal communication port such that at least a first portion of the universal communication port's coupler lines are electrically connected to at least a portion of the external system's connector lines;
perform an evaluation of at least one electrical property manifested in the first portion of coupler lines to determine whether data or power characteristics of the external system are identifiable from among the plurality of known compatible external systems with which the computing system can automatically interface using the universal communication port;
based on the evaluation, detect which external system has been connected to the universal communication port and determining whether the port's data or power line associations are properly routed for communication with the external system; and
when the evaluation indicates the external system is among the known compatible external systems with which the computing system can automatically interface using the universal communication port, automatically routing at least a second portion of the coupler lines to a corresponding converter subsystem according to the detected data or power line associations, the converter subsystem corresponding to the detected external system, the subsystem being configured to interface the computing system with the external system.

23. The system of claim 22, wherein the evaluation of the at least one electrical property of at least one of the first portion of the coupler lines includes determining:
(a) whether the first portion of the coupler lines presents an analog signal;
(b) whether the first portion of the coupler lines presents a digital signal;
(c) a voltage carried by a first coupler line relative to one of a ground and a second coupler line;
(d) a resistance of the first coupler line relative to the second coupler line; and
(e) an impedance of the first coupler line relative to the second coupler line.

24. The system of claim 23, wherein identification of the characteristics of the external system includes identifying the external system as one of:
(a) a public switched telephone network, wherein the second portion of the conductor lines includes connector lines used by the public switched telephone network, and wherein the subsystem with which the second portion of the conductor lines is selectively interconnected includes a modem;
(b) a conventional telephone device, wherein the second portion of the conductor lines includes connector lines used for audio input and output, and wherein the subsystem with which the second portion of the conductor lines is selectively interconnected includes a telephone-to-AC97 converter and an AC97 CODEC;
(c) a user interface telephone device configured to be used as an audio input or output device for a computing device, wherein the second portion of the conductor lines includes connector lines used for audio input and output, and wherein the subsystem with which the second portion of the conductor lines is selectively interconnected includes the AC97 CODEC;
(d) an integrated services data network, wherein the second portion of the conductor lines includes connector lines used for integrated services data network communication, and wherein the subsystem with which the second portion of the conductor lines is selectively interconnected includes an integrated services data network terminal adapter;
(e) an Ethernet network, wherein the second portion of the conductor lines includes connector lines used for Ethernet communication, and wherein the subsystem with which the second portion of the conductor lines is selectively interconnected includes an Ethernet adapter;
(f) a power source, wherein the second portion of the conductor lines includes power lines, and wherein the subsystem with which the second portion of the conductor lines is selectively interconnected includes a power receiver; and
(g) a computer input or output device, wherein the second portion of the conductor lines includes connector lines used for input or output devices, and wherein the subsystem with which the second portion of the conductor lines is selectively interconnected includes an input or output interface.

25. The system of claim 24, wherein the coupler includes a jack, and wherein the connector includes a plug configured to be received within and electrically mated with the jack.

26. The system of claim 25, wherein the jack includes an RJ-45 jack presenting a plurality of pins configured to receive electrical signals from the plug, and the plug includes one of:
   (a) an RJ-45 plug; and
   (b) an RJ-11 plug.

27. The system of claim 26, wherein the identification of the external system as the public switched telephone network is made by detecting a predefined voltage between a coupler line engaging pin 4 and a coupler line engaging pin 5.

28. The system of claim 26, wherein the identification of the external system as the conventional telephone device is made by detecting a predefined resistance between the coupler line engaging pin 3 and the coupler line engaging pin 4.

29. The system of claim 26, wherein the identification of the external system as the integrated services data network is made by detecting:
   (a) a voltage in a predefined range between a coupler line engaging pin 3 and a coupler line engaging one of pins 5 and 6; and
   (b) a voltage in a predefined range between coupler line engaging pin 4 and a coupler line engaging one of pins 5 and 6.

30. The system of claim 26, wherein the identification of the external system as the Ethernet network is made by detecting:
   (a) a predefined range of resistance between a coupler line engaging pin 1 and a coupler line engaging one of pins 3 and 6; and
   (b) a predefined range of resistance between a coupler line engaging pin 2 and a coupler line engaging one of pins 3 and 6.

31. The system of claim 26, wherein the identification identifies the external system as a Power over Ethernet network by detecting:
   (a) a predefined voltage differential between a coupler line engaging pin 4 and a coupler line engaging one of pins 7 and 8; and
   (b) a predefined voltage differential between a coupler line engaging pin 5 and a coupler line engaging one of pins 7 and 8.

32. The system of claim 26, wherein the identification identifies the external system as a Gigabit Ethernet network by detecting substantially a zero direct current voltage between a coupler line engaging pin 4 and a coupler line engaging pin 5.

33. The system of claim 22, further comprising a connection status indicator that indicates whether the external system is successfully interfaced with the computing system, by indicating one or more states of the interface, the one or more states including:
   (a) a state in which the external system has successfully interfaced with the computing system;
   (b) a state in which the evaluation of the electrical property indicates an external system has been detected, but that the external system has not successfully interfaced with the computing system; and
   (c) a state in which the evaluation of the electrical property indicates that an external system is not associated with the connector lines.

34. The system of claim 33, wherein the connection status indicator includes at least one light emitting device, the connection status indicator presenting lights of different colors indicative of the states.

35. The system of claim 22, further comprising a plurality of couplers, each of the plurality of couplers presenting a plurality of coupler lines.

36. The system of claim 35, wherein the controller is further configured such that upon determining that a telephone device is connected with a first coupler and that a public switched telephone network is connected with a second coupler, the controller selectively interconnects the coupler lines between the first coupler and the second coupler to enable the telephone device to be used with the public switched telephone network when the computing system is not using the public switched telephone network for data communication.

37. The system of claim 36, wherein the controller is further configured to draw power from the public switched telephone network when the computing system is powered down, to maintain an interconnection between the coupler lines of the first coupler and the second coupler.

38. The system of claim 22, wherein the controller is further configured, so that upon determining that a telephone device is connected with a first coupler and that a second coupler of the computing system is coupled with a broadband Internet connection, the controller couples the telephone device to serve as an input or output device for Voice over Internet Protocol over the broadband Internet connection.

39. A system for facilitating communication between a computing system and external systems, comprising:
   at least one universal communication port presenting a plurality of coupler lines configured to engage a connector associated with one of a plurality of compatible external systems and presenting a plurality of connector lines for coupling the external system to the computer system, the universal communication port being configured to receive and initialize one of the plurality of compatible external systems, wherein at least two of the external systems include different connector lines, the different connector lines including different data or power line associations, the universal communication port being further configured to accept a plurality of different connector types, the external system including one of:
   a public switched telephone system;
   a telephone device; and
   a network connection;
   a controller in communication with the plurality of coupler lines for each universal communication port and configured to:
      evaluate at least one electrical property of at least one of a first portion of the coupler lines from a coupler to identify which external system has engaged the universal communication port and whether the port's data or power line associations are properly routed for communication with the external system; and
      based on the identification of the external system, automatically routing a second portion of the coupler lines to a corresponding converter subsystem according to the detected data or power line associations, the converter subsystem corresponding to the identified external system, the subsystem being configured to interface the computing system with the external system, such that:

when the external system includes a public switched telephone network, the second portion of the coupler lines is interconnected with a telephone interface;

when the external system includes a telephone device, the second portion of the coupler lines is interconnected with a telephone converter enabling the telephone device to be used as an input or output device for a computing system application; and when the external system includes a network connection, the second portion of the coupler lines is interconnected with a network adapter configured to enable the computing system to communicate over the network connection.

40. A method for facilitating communication between a computing system and an external system using a universal communication port, comprising the steps of:

equipping the computing system with at least one universal communication port presenting a plurality of coupler lines configured to engage an RJ-45 connector associated with one of a plurality of compatible external systems and presenting a plurality of connector lines for coupling the external system to the computer system, the universal communication port being configured to receive and initialize one of the plurality of compatible external systems, wherein at least two of the external systems include different connector lines, the different connector lines including different data or power line associations;

determining that an external system's RJ-45 connector has been engaged with the with the universal communication port such that at least a first portion of the universal communication port's coupler lines are electrically connected to at least a portion of the external system's connector lines;

performing an evaluation of at least one electrical property manifested in the first portion of coupler lines to determine whether data or power characteristics of the external system are identifiable from among the plurality of known compatible external systems with which the computing system can automatically interface using the universal communication port;

based on the evaluation, detecting which external system has been connected to the universal communication port and determining whether the port's data or power line associations are properly routed for communication with the external system; and when the evaluation indicates the external system is among the known compatible external systems with which the computing system can automatically interface using the universal communication port, automatically routing at least a second portion of the coupler lines to a corresponding converter subsystem according to the detected data and/or power line associations, the converter subsystem corresponding to the detected external system, the subsystem being configured to interface the computing system with the external system.

* * * * *